United States Patent
Synnergren et al.

(10) Patent No.: US 10,171,417 B2
(45) Date of Patent: Jan. 1, 2019

(54) DISTRIBUTED IP ALLOCATION AND DE-ALLOCATION MECHANISM IN A COMMUNICATIONS NETWORK HAVING A DISTRIBUTED S/PGW ARCHITECTURE

(71) Applicant: Telefonaktiebolaget LM Ericsson (publ), Stockholm (SE)

(72) Inventors: Per Synnergren, Gammelstad (SE); Johan Kristiansson, Lulea (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/517,876

(22) PCT Filed: Oct. 7, 2014

(86) PCT No.: PCT/SE2014/051166
§ 371 (c)(1),
(2) Date: Apr. 7, 2017

(87) PCT Pub. No.: WO2016/056958
PCT Pub. Date: Apr. 14, 2016

(65) Prior Publication Data
US 2017/0310637 A1 Oct. 26, 2017

(51) Int. Cl.
*H04L 29/12* (2006.01)
*G06F 11/00* (2006.01)
(Continued)

(52) U.S. Cl.
CPC .......... *H04L 61/2061* (2013.01); *G06F 11/00* (2013.01); *G06F 12/00* (2013.01);
(Continued)

(58) Field of Classification Search
CPC ..... H04L 45/7453; H04L 45/38; H04L 45/54; H04L 88/16; H04L 61/2061; H04L 29/08;
(Continued)

(56) References Cited

U.S. PATENT DOCUMENTS

2009/0282048 A1  11/2009  Ransom et al.

FOREIGN PATENT DOCUMENTS

EP          1655928 A1      5/2006

OTHER PUBLICATIONS

3GPP TS 23.401 version 12.6.0 (Release 12), "General Packet Radio Service (GPRS) enhancements for Evolved Universal Terrestrial Radio Access Network (E-UTRAN) access", ETSI TS 123 401 V12.6.0 (Sep. 2014), 308 pages.
(Continued)

*Primary Examiner* — Eric Myers
(74) *Attorney, Agent, or Firm* — Sage Patent Group

(57) ABSTRACT

A non-transitory computer readable medium has instructions stored therein to be executed by a packet processing unit (PPU) in a communications network to allow a plurality of PPUs in the communications network to independently allocate IP addresses from a shared pool of IP addresses. The plurality of PPUs collectively maintain a distributed hash table (DHT). The DHT stores a distributed block allocation table (DBAT) and a plurality of distributed address allocation tables (DAATs). The DBAT includes an entry for each of a plurality of blocks of IP addresses to indicate which of the plurality of blocks are allocated to which of the plurality of PPUs. Each of the plurality of DAATs corresponds to one of the blocks in the DBAT and includes an entry for each of the IP addresses in that block to indicate which of the IP addresses in that block are allocated to which user entities.

17 Claims, 13 Drawing Sheets

(51) Int. Cl.
| | |
|---|---|
| *H04L 29/08* | (2006.01) |
| *H04W 8/26* | (2009.01) |
| *G06F 12/00* | (2006.01) |
| *H04L 29/14* | (2006.01) |
| *H04L 12/743* | (2013.01) |

(52) U.S. Cl.
CPC .............. *H04L 29/08* (2013.01); *H04L 29/12* (2013.01); *H04L 61/2015* (2013.01); *H04W 8/26* (2013.01); *H04L 45/7453* (2013.01); *H04L 67/10* (2013.01); *H04L 67/2842* (2013.01); *H04L 69/40* (2013.01)

(58) Field of Classification Search
CPC ...... H04L 29/12; H04L 61/2015; H04W 8/26; G06F 11/00
See application file for complete search history.

(56) References Cited

OTHER PUBLICATIONS

3GPP TS 23.402 version 12.6.0 ( Release 12), "Universal Mobile Telecommunications System (UMTS); Architecture enhancements for non-3GPP accesses", ETSI TS 123 402 V12.6.0 (Sep. 2014), 290 pages.
3GPP TS 29.061 version 11.7.0 (Release 11), "Interworking between the Public Land Mobile Network (PLMN) supporting packet based services and Packet Data Networks (PDN); Digital cellular telecommunications system (Phase 2+); Universal Mobile Telecommunications System (UMTS)" ETSI TS 129 061 V11.7.0 (Jul. 2014), 165 pages.
3GPP TS 29.274 version 11.11.0, "3GPP Evolved Packet System (EPS); Evolved General Packet Radio Service (GPRS) Tunnelling Protocol for Control plane (GTPv2-C) Universal Mobile Telecommunications System (UMTS)" Release 11, ETSI TS 129 274 V11.11.0 (Jul. 2014), 234 pages.
3GPP TS 29.281 version 11.6.0, "General Packet Radio System (GPRS) Tunnelling Protocol User Plane (GTPv1-U); Universal Mobile Telecommunications System (UMTS)", Release 11, ETSI TS 129 281 V11.6.0 (Apr. 2013), 29 pages.
Demers, et al., "Epidemic algorithms for replicated database maintenance", Association of Computing Machinery, Xerox Corporation, Palo Alto Research Center, CSL-89-1, Jan. 1989, 28 pages.
Fischer, et al., "A Distributed IP Mobility Approach for 3G SAE", IEEE, 2008, 6 pages.
Hahn, "Flat 3GPP Evolved Packet Core; Improvement for multiple network connections", 14th International Symposium on Wireless Personal Multimedia Communications (WPMC), 2011, 5 pages.
Hamilton, "Files Systems, Physical View (Disk Allocation Methods)" University of Regina, Professor Hamilton's course notes downloaded from http://www2.cs.uregina.ca/~hamilton/courses/330/notes/allocate/allocate.html on Oct. 3, 2014, 9 pages.

International Search Report and the Written Opinion of the International Searching Authority from counterpart PCT Application No. PCT/SE2014/051165, dated Feb. 16, 2015, 12 pages.
International Search Report and the Written Opinion of the International Searching Authority from counterpart PCT Application No. PCT/SE2014/051166, dated Jun. 3, 2015, 9 pages.
Kaashoek, et al., "Koorde: A Simple Degree-Optimal Distributed Hash Table" Peer-to-Peer Systems II, vol. 2735, 2003, 6 pages.
Katanekwa, et al., "Enhanced Gateway Selection for Optimal Routing in a Distributed Evolved Packet Core (EPC) Network," 10th International Conference on Electrical Engineering/Electronics, Computer, Telecommunications and Information Technology (ECTI-CON), 2013, 6 pages.
Liang, et al., "Understanding KaZaA", 2004, 7 pages.
Maymounkov, et al., "Kademlia: A Peer-to-Peer Information System Based on the XOR Metric," Proceeding of IPTPS '01 Revised Papers from the First International Workshop on Peer-to-Peer Systems, 2002, pp. 53-65.
Pinakoulakis, et al., "Anchor-less Network Architecture Using P2P and DHT" Master Thesis, KTH Royal Institute of Technology, Nov. 4, 2013, 86 pages.
RFC 3633: Troan, et al., "IPv6 Prefix Options for Dynamic Host Configuration Protocol (DHCP) version 6," The Internet Society, Network Working Group, Request for Comments, Dec. 2003, 19 pages.
Rowstron, et al., "Pastry: Scalable, decentralized object location and routing for large-scale peer-to-peer systems" Proc. of the 18th IFIP/ACM International Conference on Distributed Systems Platforms, 2001, 22 pages.
Stoica, et al., "Chord: A Scalable Peer-to-peer Lookup Service for Internet Applications," SIGCOMM'01, Aug. 27-31, 2001, 12 pages.
Tanenbaum, et al., "Modern Operating Systems," 2007, 3rd Edition, details downloaded from https://www.amazon.com/Modern-Operating-Systems-3rd-Edition/dp/0136006639 on Oct. 3, 2014, 5 pages.
"The Apache Cassandra Project," downloaded from http://cassandra.apache.org/ on Oct. 3, 2014, 2 pages.
Wikipedia, "Free list", available at https://en.wikipedia.org/wiki/Free_list, downloaded from https://web.archive.org/web/20140922092635/http://en.wikipedia.org/wiki/Free_list, last modification May 19, 2014, 1 page.
Wikipedia, "Buddy Memory Allocation", downloaded from http://en.wikipedia.org/wiki/Buddy_memory_allocation on Oct. 3, 2014, 5 pages.
Wikipedia, "Consensus (Computer Science)," downloaded from http://en.wikipedia.org/wiki/Consensus_(computer_science) on Oct. 3, 2014, 7 pages.
Wikipedia, "Gnutella", downloaded from http://en.wikipedia.org/wiki/Gnutella on Oct. 3, 2014, 5 pages.
Wikipedia, "Gossip Protocol", downloaded from http://en.wikipedia.org/wiki/Gossip_protocol on Oct. 3, 2014, 7 pages.
Wu, et al., "Experience Implementing an IP Address Closure," 20th Large Installation System Administration Conference (LISA '06), pp. 119-130.
Zhao, et al., "Tapestry: A Resilient Global-Scale Overlay for Service Deployment" IEEE Journal on Selected Areas in Communications, Jan. 2004, vol. 22 (1), pp. 41-53.

| Key (302) | Value (304) |
|---|---|
| (306) BAT + Block$_1$ | PPU ID |
| (308) BAT + Block$_2$ | PPU ID |
| ... | ... |
| (310) BAT + Block$_n$ | PPU ID |

Fig. 3

| Key (402) | Value (404) |
|---|---|
| (406) AAT + Block$_1$ + IP Address$_1$ | UE ID |
| (408) AAT + Block$_1$ + IP Address$_2$ | UE ID |
| ... | ... |
| (410) AAT + Block$_1$ + IP Address$_n$ | UE ID |

Fig. 4

DISTRIBUTED IP ALLOCATION AND DE-ALLOCATION MECHANISM IN A COMMUNICATIONS NETWORK HAVING A DISTRIBUTED S/PGW ARCHITECTURE

RELATED APPLICATIONS

This application is a national stage of International Application No. PCT/SE2014/051166, filed Oct. 7, 2014, which is hereby incorporated by reference. Cross-reference is made to U.S. Application No. [Not Yet Assigned], entitled "Routing in a Communications Network Having a Distributed S/PGW Architecture" which is a national stage of International Application No. PCT/SE2014/051165, filed Oct. 7, 2014, and commonly owned. The cross-referenced application is incorporated herein by reference.

TECHNICAL FIELD

The present disclosure relates to IP address allocation in a communications network. More specifically, the present disclosure relates to a distributed IP allocation mechanism in a communications network having a distributed S/PGW architecture.

BACKGROUND

The Evolved Packet Core (EPC) is an all-IP mobile core network for the Long Term Evolution (LTE) wireless communication standard. The Third Generation Partnership Project (3GPP) has standardized the EPC starting from release 8. Most 4G mobile broadband (MBB) radio access networks (RANs) and some 3G RANs are supported by an EPC core network to provide end-to-end MBB service.

A typical EPC network deploys Packet Data Network Gateways (PDN-GW or PGW) at a few centrally located data centers. Typically, operators deploy PGWs in the same physical sites at which the operators access their Internet peering points, or in locations with reliable access to sites with Internet peering. This deployment model is quite effective for today's network traffic, in which the absolute majority of packets are addressed to/from the Internet and thus go through the Internet peering point. For more detail on EPC and PGW functions, see 3GPP TS 23.401 and 23.402.

An increasing share of network traffic is related to the enterprise and automation industry segments. Enterprise and industry segment users may want to deploy networks in which the data is locally terminated and sent only locally (e.g., between a sensor and a server) without accessing the Internet peering point. Locally terminated data may provide more security and increase delay performance (that is, reduce delay). As such, locally terminated data may also improve human-to-human communication, especially for delay sensitive applications such as real-time gaming applications. The current EPC network architecture that builds a hierarchy of serving gateways (SGWs) and PGWs may not be suitable for efficiently processing locally terminated data. A shift in the EPC network architecture to handle the increasing demand for locally terminated data may require changes to features traditionally provided by SGWs and/or PGWs, including IP address allocation.

SUMMARY

A non-transitory computer readable medium has instructions stored therein to be executed by a packet processing unit (PPU) in a communications network to allow a plurality of PPUs in the communications network to independently allocate IP addresses from a shared pool of IP addresses. The plurality of PPUs in the communications network collectively maintain a distributed hash table (DHT). The DHT stores a distributed block allocation table (DBAT) and a plurality of distributed address allocation tables (DAATs). The DBAT includes an entry for each of a plurality of blocks of IP addresses to indicate which of the plurality of blocks are allocated to which of the plurality of PPUs. Each of the plurality of DAATs corresponds to one of the blocks in the DBAT and includes an entry for each of the IP addresses in that block to indicate which of the IP addresses in that block are allocated to which user entities (UEs). The execution causes the PPU to perform a set of operations including, receiving, by the PPU, a request to allocate an IP address to a UE, choosing, from one of a set of one or more of the blocks of IP addresses currently allocated to the PPU, one of the IP addresses in the block that a locally cached version of the DAAT corresponding to the block indicates as being available, looking up, using a DHT algorithm, which of the plurality of PPUs is responsible for storing the DAAT entry in the DHT for the chosen IP address, causing the PPU responsible for storing the DAAT entry in the DHT for the chosen IP address to update that DAAT entry to indicate that the chosen IP address is allocated to the UE, updating the locally cached version of the DAAT corresponding to the block to indicate that the chosen IP address is allocated to the UE, and allocating the chosen IP address to the UE.

A method is performed by a packet processing unit (PPU) in a communications network to allow a plurality of PPUs in the communications network to independently allocate IP addresses from a shared pool of IP addresses. The plurality of PPUs in the communications network collectively maintain a distributed hash table (DHT). The DHT stores a distributed block allocation table (DBAT) and a plurality of distributed address allocation tables (DAATs). The DBAT includes an entry for each of a plurality of blocks of IP addresses to indicate which of the plurality of blocks are allocated to which of the plurality of PPUs. Each of the plurality of DAATs corresponds to one of the blocks in the DBAT and includes an entry for each of the IP addresses in that block to indicate which of the IP addresses in that block are allocated to which user entities (UEs). The method receives a request to allocate an IP address to a UE. The method chooses, from one of a set of one or more of the blocks of IP addresses currently allocated to the PPU, one of the IP addresses in the block that a locally cached version of the DAAT corresponding to the block indicates as being available. The method looks up, using a DHT algorithm, which of the plurality of PPUs is responsible for storing the DAAT entry in the DHT for the chosen IP address. The method causes the PPU responsible for storing the DAAT entry in the DHT for the chosen IP address to update that DAAT entry to indicate that the chosen IP address is allocated to the UE, updates the locally cached version of the DAAT corresponding to the block to indicate that the chosen IP address is allocated to the UE, and allocates the chosen IP address to the UE.

A network device is configured to function as a packet processing unit (PPU) in a communications network to allow a plurality of PPUs in the communications network to independently allocate IP addresses from a shared pool of IP addresses. The plurality of PPUs in the communications network collectively maintain a distributed hash table (DHT). The DHT stores a distributed block allocation table (DBAT) and a plurality of distributed address allocation tables (DAATs). The DBAT includes an entry for each of a plurality of blocks of IP addresses to indicate which of the plurality of blocks are allocated to which of the plurality of PPUs. Each of the plurality of DAATs corresponds to one of the blocks in the DBAT and includes an entry for each of the IP addresses in that block to indicate which of the IP addresses in that block are allocated to which user entities (UEs). The network device includes a processor and a memory. The memory contains instructions executable by the processor whereby the network device is operative to receive a request to allocate an IP address to a UE. The memory contains further instructions executable by the processor to choose, from one of a set of one or more of the blocks of IP addresses currently allocated to the PPU, one of the IP addresses in the block that a locally cached version of the DAAT corresponding to the block indicates as being available. The memory contains further instructions executable by the processor to look up, using a DHT algorithm, which of the plurality of PPUs is responsible for storing the DAAT entry in the DHT for the chosen IP address. The memory contains further instructions executable by the processor to cause the PPU responsible for storing the DAAT entry in the DHT for the chosen IP address to update that DAAT entry to indicate that the chosen IP address is allocated to the UE, to update the locally cached version of the DAAT corresponding to the block to indicate that the chosen IP address is allocated to the UE, and allocate the chosen IP address to the UE.

BRIEF DESCRIPTION OF THE DRAWINGS

Aspects of the present disclosure are illustrated by way of example and are not limited by the accompanying drawings. In the drawings:

FIG. 3 is an exemplary BAT that stores entries as a key-value pair;

FIG. 4 is an exemplary AAT that stores entries as a key-value pair;

DETAILED DESCRIPTION

Figure 1:
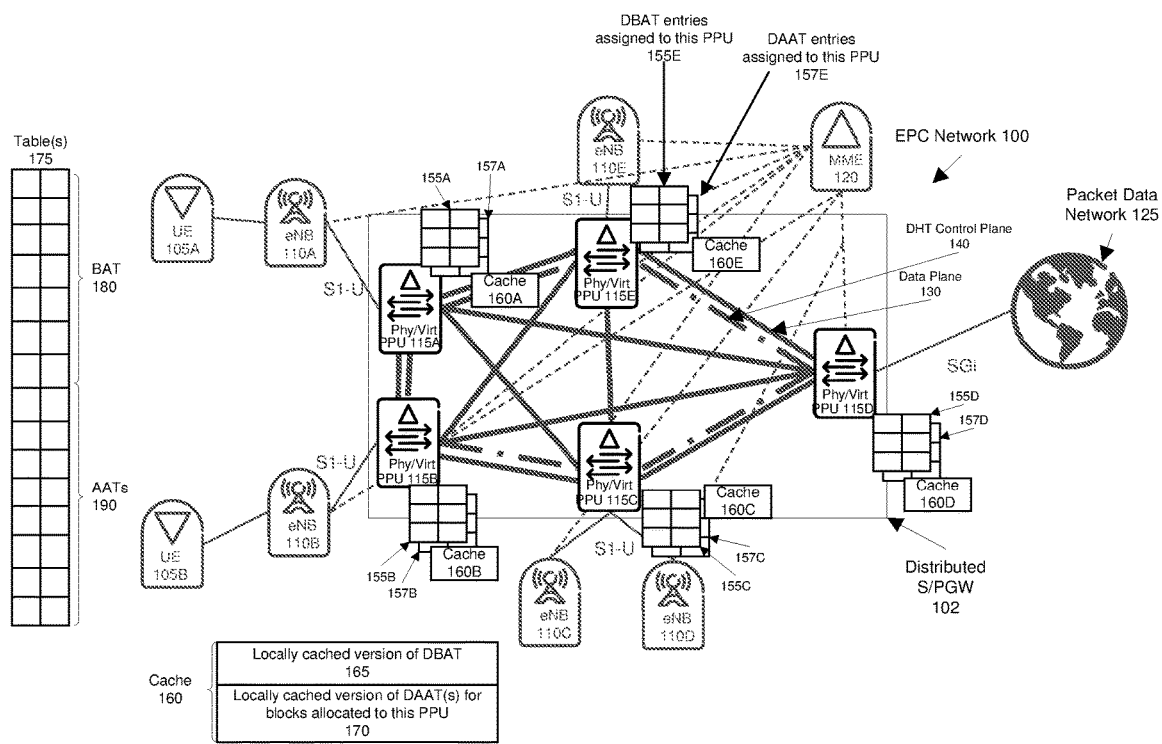
FIG. 1 is a diagram of one embodiment of an EPC network having a distributed S/PGW architecture.

The following description describes methods, systems, and apparatus to support a distributed IP allocation and de-allocation mechanism in a communications network having a distributed Serving and Packet Data Network Gateway (S/PGW) architecture. While the invention will be described in the context of an Evolved Packet Core (EPC) network, it will be apparent to one of ordinary skill in the art that the invention may be deployed in other all-IP mobile core communications networks. In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

As used herein, the singular forms "a," "an," and "the" are intended to include the plural forms as well, unless the context clearly indicates otherwise. The term "and/or" includes any and all combinations of one or more of the associated listed items.

As used herein, the terms "comprise," "comprising," "comprises," "include," "including," "includes," "have," "has," "having," or variants thereof are open-ended, and include one or more stated features, elements, steps, components or functions but does not preclude the presence or addition of one or more other features, elements, steps, components, functions or groups thereof.

Some embodiments are disclosed in the context of an example EPC network having a distributed S/PGW architecture as shown in FIG. 1. An overview of the EPC network of FIG. 1 is initially provided, and then various diagrams of operations according to embodiments disclosed herein are explained in the context of the EPC network of FIG. 1. However, it should be understood that the operations of diagrams can be performed by embodiments of the invention other than those discussed with reference to FIG. 1, and the embodiments discussed with reference to FIG. 1 can perform operations different than those discussed with reference to the flow diagrams.

FIG. 1 is a diagram of one embodiment of an EPC network having a distributed S/PGW architecture. The example EPC network 100 includes a set of user entities (UEs) 105A-E that communicates through radio access communication with an eNodeB (eNB) 110A-E. A UE 105 can be any type of stationary or mobile device including cellular phone, tablet computer, laptop, desktop, console device, sensor, or similar electronic device that can connect to the EPC network via an eNB. For clarity, the example network shows a single UE 105 connecting to an eNB 110. However, more than one UE 105 may be connected to an eNB 110 at a given time. The example EPC network 100 also includes a set of physical or virtual packet processing units (PPUs) 115A-E that form a distributed S/PGW 102. Any number of PPUs 115 can form the distributed S/PGW 102. The distributed S/PGW 102 can perform packet routing, mobility management of UEs 105, IP address allocation, and other functions traditionally performed by Serving Gateways (SGWs) and/or Packet Data Network Gateways (PGWs). Each PPU 115 of the distributed S/PGW may communicate with other PPUs 115 to exchange control information over a control plane 140 and to forward data over a data plane 130. The eNBs 110 are communicatively coupled to one or more PPUs 115 via an S1-U interface to provide UEs 105 with access to the distributed S/PGW 102 (see 3GPP TS 29.281). The PPU 115 that a UE 105 is currently using to connect to the EPC network 100 will be referred to herein as the serving PPU for the UE 105. For example, in the EPC network 100 of FIG. 1, PPU 115A is currently a serving PPU for UE 105A, and PPU 115B is currently a serving PPU for UE 105B. Some PPUs 115 such as PPU 115D are connected to a packet data network (PDN) 125 (e.g., the Internet) via an SGi interface (see 3GPP TS 29.061). The PPUs 115 and the eNBs 110 can communicate with a Mobility Management Entity (MME) 120. The MME 120 performs control functions related to subscriber and session management. For example, the MME 120 can manage the assignment of network resources, attachment of UEs 105 to the EPC network 100, and handover of UEs 105 between PPUs 115. The eNB 110 constitutes the radio access network (RAN) portion of the network, while the distributed S/PGW 102 and the MME 120 constitute the packet core portion of the network.

Unlike traditional EPC networks that include a single one or build a hierarchy of Serving Gateways (SGW) and Packet Data Network Gateways (PGW) (network of sub-networks), a distributed S/PGW architecture implements a flat topology where each PPU 115 of the distributed S/PGW 102 is connected to the same IP network but each of the PPUs still act as independent routers. To implement a fully distributed S/PGW architecture, it is desirable for each PPU 115 to be able to act as its own IP address allocation server (e.g., Dynamic Host Configuration Protocol (DHCP) server). However, as the PPUs 115 are all connected to the same IP network, it is preferable that the PPUs 115 can allocate IP addresses to UEs 105 from a shared pool of IP addresses. In one embodiment, this can be achieved by implementing a block based shared IP address allocation table that allows each PPU 115 to independently assign IP addresses to connected UEs 105 from those of the block(s) of IP addresses from the shared pool of IP addresses assigned to it. Specifically, the entire IP address space (e.g., class A IPv4 address) that belongs to the EPC network 100 is divided into N number of blocks according to a predefined layout scheme, and PPUs 115 can reserve a block of IP addresses that it can directly allocate to UEs 105 independently of other PPUs 115. This allows PPUs 115 to directly allocate IP addresses to UEs 105 instead of relying on a PGW or a centralized DHCP server to allocate IP addresses as is typically done in traditional EPC networks. This may be useful, for example, for allocating IP addresses to UEs 105 that wish to send and/or receive locally terminated data that does not go through a PGW.

In one embodiment, information regarding the assignment of blocks and IP addresses can be stored in one or more tables 175 shared by the PPUs 115 of the distributed S/PGW 102. In one embodiment, a Block Allocation Table (BAT) 180 identifies which blocks are assigned to which PPUs 115. In one embodiment, Address Allocation Tables (AATs) 190 corresponding to each of the blocks identify which IP addresses within a particular block are allocated to which UEs 105. Thus, the PPUs 115 of the distributed S/PGW 102 can maintain the BAT 180 and the AATs 190 to indicate the current assignment of blocks (to PPUs 115) and IP addresses (to UEs 105).

In one embodiment, the BAT 180 and the AATs 190 can be distributively stored and maintained by the PPUs 115 of the distributed S/PGW 102 using a distributed hash table (DHT). As is well-known to one having ordinary skill in the art, a DHT provides a decentralized/distributed system that provides a lookup service. Key-value pairs are stored in the DHT, and any node participating in the DHT can efficiently retrieve the value corresponding to a given key. While in one embodiment the Chord DHT protocol is used to establish and maintain the DHT (see Stoica, Ion, et al., *Chord: A Scalable Peer-to-Peer Lookup Service for Internet Applications*, ACM SIGCOMM Computer Communication Review. Vol. 31. No. 4. ACM, 2001), alternative embodiments of the invention can use other suitable DHT protocols such as Pastry, Tapestry, and Kademlia (see Rowstron, Antony, et al., *Pastry: Scalable, Decentralized Object Location and Routing for Large-scale Peer-to-peer Systems*, 18$^{th}$ IFIP/ACM International Conference on Distributed Systems Platforms (Middleware 2001). Heidelberg, Germany, November 2001; see Zhao, Ben Y., et al., *Tapestry: A Resilient Global-Scale Overlay for Service Deployment*, IEEE Journal on Selected Areas in Communication. Vol. 22. No. 1. January 2004; see Maymounkov, Petar, et al., *Kademlia: A Peer-to-peer Information System Based on the XOR Metric*, IPTPS 2001 Revised Papers from the First International Workshop on Peer-to-peer Systems. 2001).

In one embodiment, each PPU 115 that forms the distributed S/PGW 102 can participate as a node in the DHT. Thus, the PPUs 115 of the distributed S/PGW 102 collectively maintain the DHT. In one embodiment, each of the BAT entries are key-value pairs (e.g., see FIG. 3) that are distributively stored among the PPUs 115 according to a DHT protocol. A BAT 180 that is distributively stored using a DHT will be referred to herein as a distributed block allocation table (DBAT). As used herein, a DBAT entry refers to a mapping of a key of the DBAT to a corresponding value. In one embodiment, each of the entries of the AATs are key-value pairs (e.g., see FIG. 4) that are distributively stored among the PPUs 115 according to a DHT protocol. The AATs 190 that are distributively stored using a DHT will be referred to herein as distributed address allocation tables (DAATs). As used herein, a DAAT entry refers to a mapping of a key of one of the DAATs to a corresponding value. In one embodiment, the same DHT structure stores both the BAT 180 the AATs 190. In other embodiments, the BAT 180 is stored on a separate DHT structure from the AATs 190. If the BAT 180 and the AATs 190 are stored in the same DHT structure, the entries for these tables can be differentiated by adding a prefix to the keys. For example, the string "BAT" can be added to DBAT keys and the string "AAT" can be added to DAAT keys. Storing the BAT 180 and AATs 190 on the same DHT structure avoids the need to deploy multiple DHT structures, thus reducing the amount of overhead for the PPUs 115 and the EPC network 100.

Conceptually, the DHT partitions the BAT 180 and AATs 190 into pieces such that PPUs 115 participating as a node in the DHT are responsible for storing a portion of the tables. For example, in the exemplary EPC network 100, PPU 115E has been assigned DBAT entries 155E and DAAT entries 157E. In this manner, each of the DBAT entries and DAAT entries is typically stored in only one of the PPUs at a time (except backup copies of DBAT entries and DAAT entries as discussed herein below). While FIG. 1 shows that each of the PPUs 115 are responsible for storing an equal amount of entries, it is possible (and likely) that not all PPUs 115 will be assigned the same number of entries. In one embodiment, a PPU 115 can store DBAT entries and DAAT entries assigned to itself using a data structure that allows for fast and efficient look up based on the key as described later herein. In one embodiment, the DHT protocol determines which PPU 115 is responsible for storing a particular key-value pair based on a hash value of the key. This can be done by using consistent hashing and assigning each PPU 115 an ID that is in the same hash space as the one used to calculate the hash value of the keys. Each PPU 115 is then responsible for storing key-value pairs having a hash value of the key that is closest to the PPU's ID compared to other PPUs 115 participating in the DHT (e.g., see Chord DHT protocol mentioned above). In one embodiment, the DHT protocol defines a distance metric that provides an abstract notion of distance between hash values (and node IDs) and this distance metric is used as part of determining which PPU 115 is responsible for storing a particular key-value pair.

In one embodiment, a PPU 115 can join the DHT by generating an ID for itself that is in the same hash space as the one used to calculate the hash value of the keys. The PPU 115 can contact any other DHT nodes (i.e., PPUs) in the DHT network and ask them to become part of the DHT. In Chord DHT this is done by asking any existing DHT node to look up the ID of the new node itself to find out where in the ring the new node should be added (i.e., finding the successor of the new node ID in the ring). During a stabilization period, the PPU 115 will take over responsibility for some of the key-value pairs according to the DHT protocol (e.g., see Chord DHT protocol mentioned above). It is to be noted that a PPU's 115 closest neighbor in the DHT is not necessarily the geographically closest PPU 115. Rather, the closest neighbor in the DHT may be determined based on a PPU's 115 position in a DHT overlay network (e.g., based on PPU ID).

In one embodiment, the DBAT entries and DAAT entries stored at a PPU 115 are replicated (not shown) at the PPU's 115 closest neighbors (that is, a backup copy) to provide better robustness and to prevent entries from being lost when a PPU 115 leaves the DHT. If a PPU 115 unexpectedly leaves the DHT, its responsibilities will be automatically taken over by some other PPUs 115 in the DHT. This self-organizing and self-healing aspect of the DHT makes it possible to dynamically add or remove PPUs 115 to the core network in a plug-and-play fashion. This feature may be useful in cases where capacity or coverage must be increased quickly (e.g., see Chord DHT protocol mentioned above). When a DBAT entry or DAAT entry is changed (i.e., added, deleted, or updated), it is important that all backup copies of the entry are changed atomically in a single operation. Otherwise, the backup copies can become inconsistent with the original entry. In one embodiment, a two-phase commit protocol can be used to ensure that all backup copies are changed atomically.

In some embodiments, each PPU 115 maintains a locally cached version of the entire DBAT 165. This enables PPUs 115 to be able to scan for available blocks in the DBAT in an efficient way. In one embodiment, the locally cached version of the DBAT 165 is implemented as a bit vector (e.g., 000010101010100111111 . . . ), where 1s indicate available blocks, 0s indicate allocated blocks, and indices in the bit vector represent block indices. As many Central Processing Unit (CPU) architectures include hardware instructions to count leading zeroes, an available block can be efficiently found by counting leading 0s in the bit vector. In another embodiment, the locally cached version of the DBAT 165 can be implemented as a linked-list or a free list. In these embodiments, indices to the free blocks are stored as a linked-list. An available block can be found by removing the last element in the linked-list and using the block index indicated in that element. A block can be de-allocated (i.e., made available) by adding an element containing the index of that block to the linked-list or free list.

In some embodiments, each PPU 115 maintains a locally cached version of the DAAT 170 for each block currently allocated to that PPU 115, similar to the locally cached version of the DBAT 165. This enables the PPU 115 to scan for available IP addresses within a block in an efficient way. An AAT 190 is generally much smaller than the BAT 180, so the locally cached version of a DAAT 170 can be stored using a fairly simple data structure such as a list or a vector data structure. Other data structures such as the bit vector described above with regard to the locally cached version of the DBAT 165 can be used as well. While the following flow diagrams are described with reference to an embodiment that uses caches as illustrated in FIG. 1, alternative embodiments do not implement caches for the DBAT entries and/or the DAAT entries.

Figure 2:
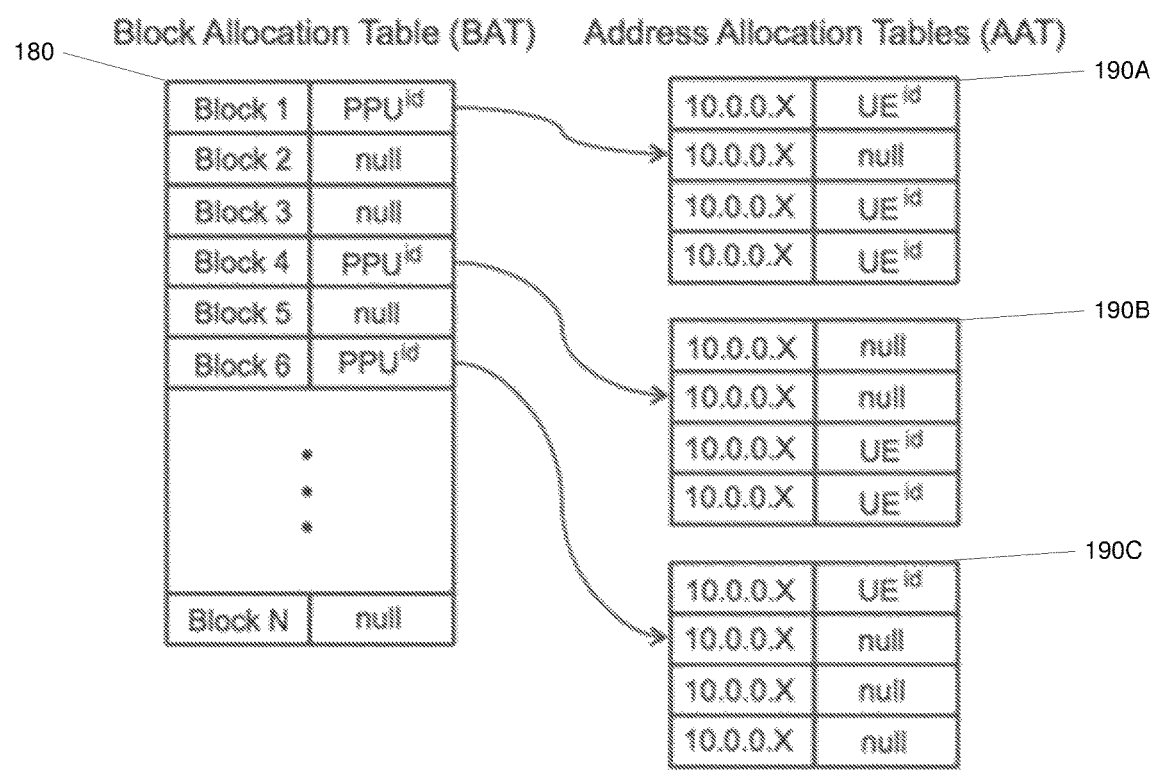
FIG. 2 is a diagram that illustrates one embodiment of a layout scheme that divides an IP address space into N number of blocks.

FIG. 2 is a diagram that illustrates one embodiment of a layout scheme that divides an IP address space into N number of blocks. As discussed above, the entire IP address space is divided into N number of blocks. As discussed above, a BAT 180 identifies which blocks are assigned to which PPUs 115. In one embodiment, the BAT 180 is represented as a table having two columns and N rows, where each of the rows corresponds to one of the blocks. The first column illustrates a block number and the second column illustrates the ID of a PPU 115 assigned to that block number (or block ID). In one embodiment, the PPU ID is an IP address of the PPU 115. One having ordinary skill in the art will understand that any value that can uniquely identify a PPU 115 can be used as a PPU ID in the BAT 180. In one embodiment, a null value in the PPU ID column indicates that the block is available (i.e., not allocated). One having ordinary skill in the art will understand that other values besides a null value can be used to indicate that the block is available. As discussed above, address allocation tables (AATs) 190A-C corresponding to each of the blocks identify which IP addresses within a particular block are allocated to which UEs 105. Thus, in this particular embodiment, there is a single BAT 180 and multiple AATs 190, each AAT 190 corresponding to one of the blocks. For example, AAT 190A corresponds to block 1, AAT 190B corresponds to block 4, and AAT 190C corresponds to block 6. In one embodiment, an AAT 190 is represented as a table having two columns, where the first column stores IP addresses and the second column stores the ID of a UE 105 assigned to that IP address. One having ordinary skill in the art will understand that any value that can uniquely identify a UE 105 can be used as a UE ID in the AAT 190. In one embodiment, a null value in the UE ID column indicates that the IP address is available (i.e., not allocated). One having ordinary skill in the art will understand that other values besides a null value can be used to indicate that the IP address is available.

FIG. 3 is an exemplary BAT that store entries as key-value pairs for fast and efficient search based on the key. Each entry in the exemplary BAT 330 maps a key 302 to a corresponding value 304. The first column of the BAT 330 illustrates a key 302 and the second column illustrates the corresponding value 304 (which can be the same values as illustrated in the second column of 180 of FIG. 2). In one embodiment where the BAT 330 and the different AATs are stored in the same DHT, each key has a prefix to indicate that an entry belongs to the BAT 330 or the AATs. For example, the string "BAT" can be added to the front of the block identifier (as shown in FIG. 2, if the IP address space is divided into N number of blocks of consecutive IP addresses, the blocks can be identified with a block identifier such as block 1, block 2, block 3, . . . , block N). For example, the key for an entry representing block1 (306) is BAT+Block1, the key for an entry representing block2 (308) is BAT+Block2, and so on.

FIG. 4 is an exemplary AAT that store entries as key-value pairs for fast and efficient search based on the key. The exemplary AAT 430 corresponds to block 1. Each entry in the exemplary AAT 430 maps a key 402 to a corresponding value 404. The first column of the exemplary ATT 430 illustrates a key 402 and the second column illustrates the corresponding value 404 (which can be the same values as illustrated in the second column of 190A illustrated in FIG. 2). In an embodiment where the BAT 330 and the different AATs 430 are stored in the same data structure, the "AAT" prefix and an AAT identifier (e.g., as illustrated in FIG. 4, the block ID of the block represented by that AAT is the AAT ID) are included in the key with the IP address. For example, the key for an entry representing the first IP address in block1 (406) is AAT+Block1+IP Address1, the key for an entry representing the second IP address in block 1 (408) is AAT+Block1+IP Address2, and so on.

While FIGS. 2, 3, and 4 illustrate the BAT and AATs as tables having two columns, it should be understood that in some embodiments, PPUs may use different types of data structures to store entries that they are responsible for (e.g., an array, a priority sorted list, key sorted array, self-balancing binary search tree, hash table); thus, the language key-value pair and a key mapped to a value may refer to a mapping that is stored in any such data structure, including a data structure that uses the key to index an entry in the data structure (i.e., a key may be generated and its value used to locate the entry) and need not store the key itself.

Example embodiments are described herein with reference to block diagrams and/or flowchart illustrations of computer-implemented methods, apparatus (systems and/or devices) and/or computer program products. It should be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Figure 5:
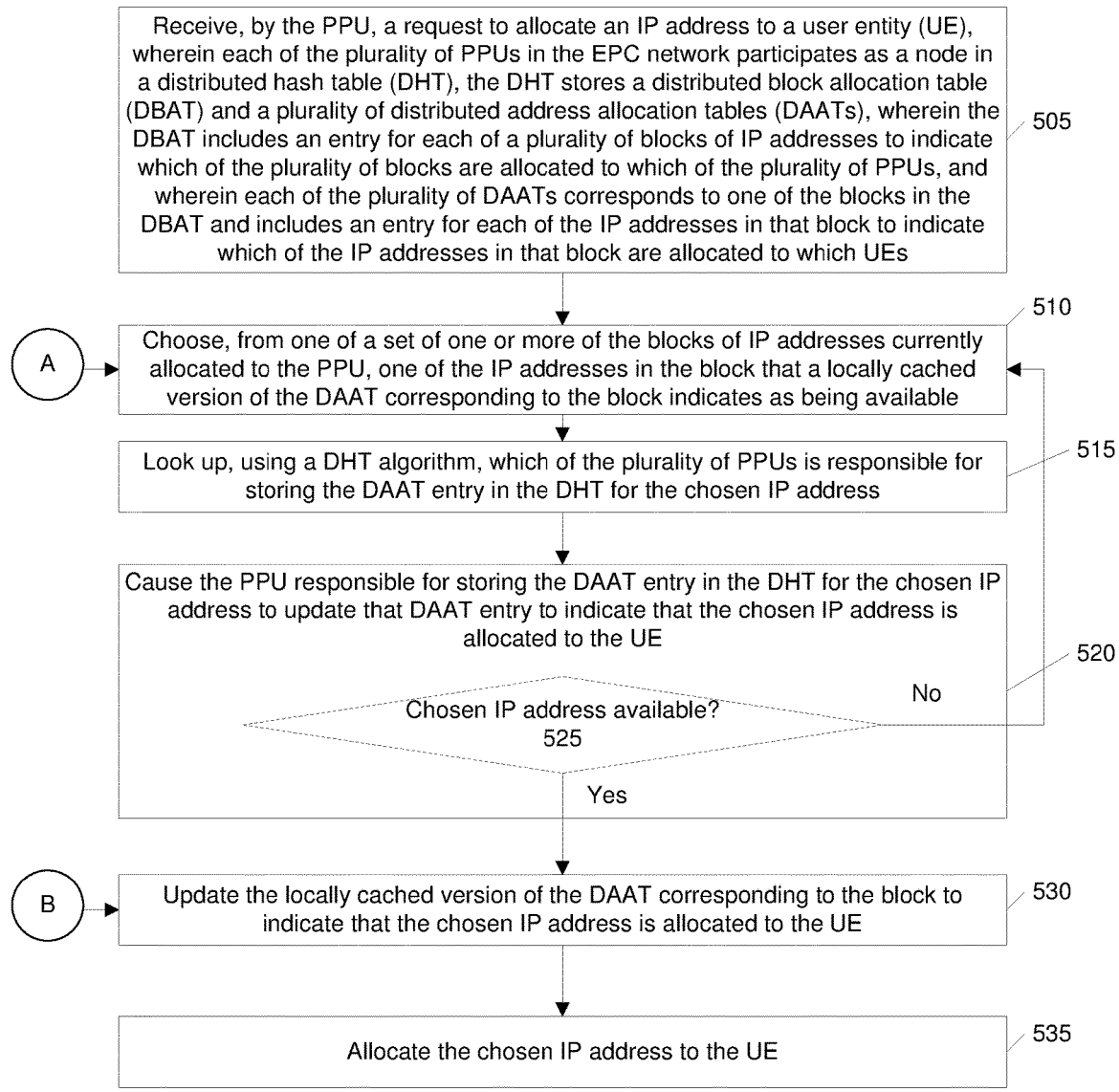
FIG. 5 is a flow diagram of one embodiment of a process for allocating an IP address to a UE.

FIG. 5 is a flow diagram of one embodiment of a process for allocating an IP address to a UE. The operations in this flow diagram and the following flow diagrams may be performed by various components of a physical or virtual PPU.

In one embodiment, the process is initiated when the PPU 115 receives a request to allocate an IP address to a UE 105 (block 505). The plurality of PPUs 115 in the communications network (e.g., an EPC network 100) collectively maintains a DHT storing a distributed block allocation table (DBAT) and a plurality of distributed address allocation tables (DAATs). The DBAT includes an entry for each of a plurality of blocks of IP addresses to indicate which of the plurality of blocks are currently allocated to which of the plurality of PPUs 115, and each of the plurality of DAATs corresponds to one of the blocks in the DBAT and includes an entry for each of the IP addresses in that block to indicate which of the IP addresses in that block are currently allocated to which UEs 105. In one embodiment, the PPU 115 receives the request as part of a UE attach procedure (see 3GPP TS 29.274).

The PPU 115 chooses, from one of a set of one or more of the blocks of IP addresses currently allocated to the PPU 115, one of the IP addresses in the block that a locally cached version of the DAAT 170 corresponding to the block indicates as being available (block 510). In one embodiment, the PPU 115 accesses the locally cached version of the DAAT 170 to find and choose an IP address that is indicated as being available. The locally cached version of the DAAT 170 can be implemented in different ways by different embodiments, and its implementation may affect how it is accessed (e.g., linearly scanned/inspected, random inspection of entries, associative data structure lookup, parallel lookup via hardware, etc.). In one embodiment, as part of block 510, the block ID of the block from which the IP address was chosen is used in block 515.

The PPU 115 uses a DHT algorithm to look up which of the plurality of PPUs 115 is responsible for storing the DAAT entry in the DHT for the chosen IP address (block 515). In one embodiment, the PPU 115 looks up which of the plurality of PPUs 115 is responsible for storing the DAAT entry in the DHT for the chosen IP address by first generating the key. For example, for the key used in the previously described embodiment illustrated in FIG. 4, the PPU 115 uses the prefix (e.g., "AAT" which is known as it is a constant), the AAT ID (which is the block ID of the block that contains the chosen IP address and known based on block 510), and the chosen IP address (which is known because it was selected in block 510) to generate the key. Second, the PPU 115 calculates a hash value of the key of that DAAT entry and the PPU 115 that has an ID that is closest to the hash value of the key is responsible for storing that DAAT entry, as described with reference to FIG. 1. The PPU responsible for storing the DAAT entry in the DHT could be a remote PPU or the PPU itself.

The PPU 115 then causes the PPU responsible for storing the DAAT entry in the DHT for the chosen IP address to update that DAAT entry to indicate that the chosen IP address is allocated to the UE 105 (block 520). The locally cached version of the DAAT 170 corresponding to a block only indicates which IP addresses in that block are likely to be available. If the locally cached version of the DAAT 170 used to choose the IP address is out of sync (lacks coherency) with the actual DAAT (stored in the DHT), then it is possible that the chosen IP address is not available. As such, in some embodiments, the PPU 115 performs a check to determine whether the chosen IP address is indeed available (decision block 525). If the chosen IP address is not available (i.e., is currently allocated to a UE 115), then the process returns to block 510, where the PPU 115 chooses a different IP address that its locally cached version of the DAAT 170 indicates as being available. If, the chosen IP address is indeed available, then the PPU 115 can proceed without choosing a different IP address. An embodiment of a process for causing a PPU responsible for storing a DAAT entry in the DHT for a chosen IP address to update that DAAT entry is described herein below in additional detail with reference to FIG. 6.

Figure 6:
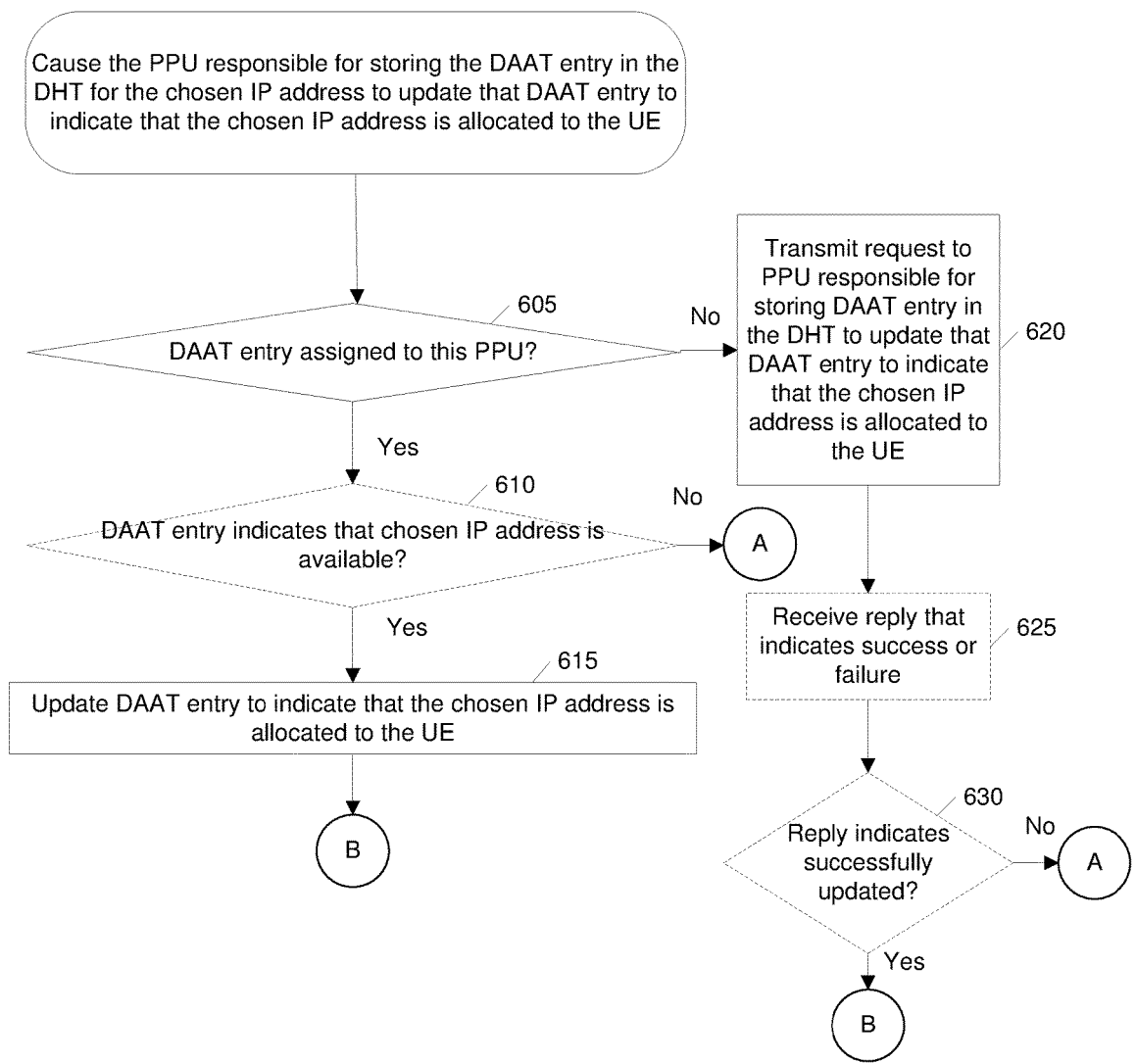
FIG. 6 is a flow diagram of one embodiment of a process for causing a PPU responsible for storing a DAAT entry in the DHT for a chosen IP address to update that DAAT entry.

FIG. 6 is a flow diagram of one embodiment of a process for causing a PPU responsible for storing a DAAT entry in the DHT for a chosen IP address to update that DAAT entry. It is to be noted that the PPU responsible for storing the DAAT entry for the chosen IP address could be a remote PPU or even the PPU itself. Thus, the PPU 115 checks whether the DAAT entry for the chosen IP address is assigned to itself (decision block 605). If so, the PPU 115 can directly check that DAAT entry to determine whether the chosen IP address is available (decision block 610), without having to transmit a request to a remote PPU 115. If the chosen IP address is available, then the PPU 115 can update that DAAT entry to indicate that the chosen IP address is now allocated to the UE 105 (block 615), and the process proceeds to block 530 to resume the IP address allocation process. On the other hand, if the DAAT entry indicates that the chosen IP address is not available (i.e., is currently allocated to a UE 115), then the process returns to block 510, where the PPU 115 chooses a different IP address that its locally cached version of the DAAT 170 indicates as being available. Returning to decision block 605, if the DAAT entry for the chosen IP address is not assigned to this PPU 115 (i.e., assigned to a remote PPU), then the PPU 115 transmits a request to the PPU responsible for storing the DAAT entry in the DHT to update that DAAT entry to indicate that the chosen IP address is allocated to the UE (block 620). In one embodiment, the PPU 115 receives a reply that indicates whether the update was successful or not (block 625). The PPU 115 checks whether the reply indicates that the DAAT entry was successfully updated (decision block 935). If the reply indicates that the update was not successful, then the process returns to block 510, where the PPU 115 chooses a different IP address that its locally cached version of the DAAT 170 indicates as being available. If the reply indicates that the update was successful, then the process proceeds to block 530 to resume the IP address allocation process.

Returning to FIG. 5, the PPU 115 also updates the locally cached version of the DAAT 170 corresponding to the block to indicate that the chosen IP address is allocated to the UE 105 (block 530). The PPU 115 then allocates the chosen IP address to the UE 105 (block 535). In one embodiment, the chosen IP address is allocated to the UE 105 using a version of DHCP (e.g., DHCPv4 or DHCPv6). In one embodiment, when a UE 105 experiences handover (i.e., UE 105 moves to another PPU 115), the UE's DHCP lease is transferred to the new PPU 115. In another embodiment, the DHCP client of the UE 105 can continue to send DHCP requests/renewals to the old PPU 115 (i.e. the PPU 115 that initially allocated the IP address to the UE 105) even after handover. In another embodiment, the UE 105 may request a new IP address when handed over to another PPU 115. In one embodiment, the UE's IP address is de-allocated if the UE 105 fails to renew its DHCP lease within a pre-determined period of time. In one embodiment, the UE's IP address is de-allocated using the operations described with reference to the flow diagram in FIG. 7 or similar operations. Different embodiments may allocate IP addresses in different ways and the invention is not limited to using DHCP. As a result of the exemplary IP allocation process described above, both the DAAT and the locally cached version of the DAAT 170 have been updated to indicate that the chosen IP address is allocated to the UE 105.

Figure 7:
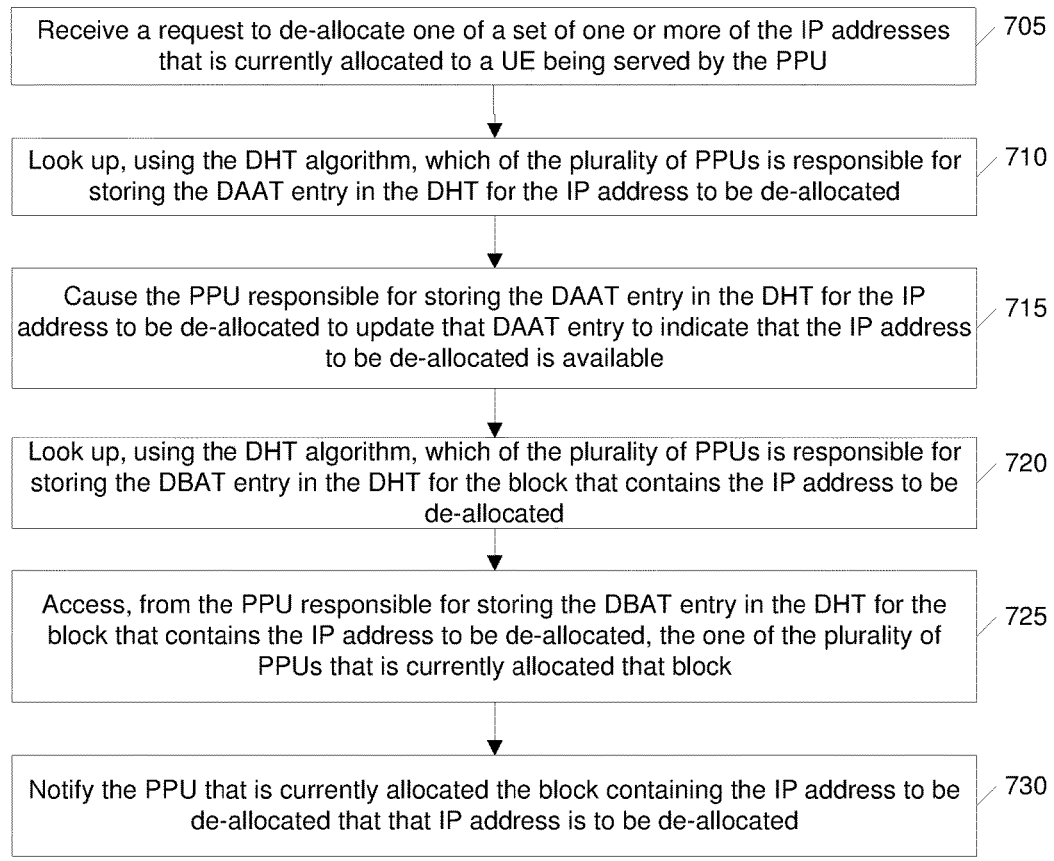
FIG. 7 is a flow diagram of one embodiment of a process for de-allocating an IP address.

FIG. 7 is a flow diagram of one embodiment of a process for de-allocating an IP address.

In one embodiment, the process is initiated when the PPU 115 receives a request to de-allocate one of a set of one or more of the IP addresses that is currently allocated to a UE 105 being served by the PPU 115 (block 705). In one embodiment, the PPU 115 receives the request as part of a UE detach procedure (see 3GPP TS 29.274).

The PPU 115 uses the DHT algorithm to look up which of the plurality of PPUs 115 is responsible for storing the DAAT entry in the DHT for the IP address to be de-allocated (block 710). In one embodiment, block 710 is performed in a similar fashion to that described with reference to block 515, but it is done for the IP address to be de-allocated and the block ID is determined based on knowledge of the block layout scheme. The PPU responsible for storing the DAAT entry in the DHT could be a remote PPU or the PPU itself.

The PPU 115 then causes the PPU responsible for storing the DAAT entry in the DHT for the IP address to be de-allocated to update that DAAT entry to indicate that the IP address to be de-allocated is available (block 715).

If the UE 105 has been handed over to another PPU 115 since first being allocated its IP address, the PPU 115 (currently serving the UE) needs to notify the owner of the block containing the IP address that the IP address is being de-allocated. This allows the owner of the block containing the IP address to update its locally cached DAAT 170 corresponding to the block. The PPU 115 can consult the DBAT to determine which PPU 115 is allocated the block containing the IP address. To do this, the PPU 115 uses the DHT algorithm to look up which of the plurality of PPUs 115 is responsible for storing the DBAT entry in the DHT for the block that contains the IP address to be de-allocated (block 720). In one embodiment, the PPU 115 can look up which block contains the IP address to be de-allocated based on knowledge of the block layout scheme. In one embodiment, the PPU 115 looks up which of the plurality of PPUs 115 is responsible for storing the DBAT entry in the DHT for the block that contains the IP address to be de-allocated based on calculating a hash value of the key of the DBAT entry. The PPU responsible for storing the DBAT entry in the DHT could be a remote PPU or the PPU itself.

The PPU 115 then accesses, from the PPU responsible for storing the DBAT entry in the DHT for the block that contains the IP address to be de-allocated, the one of the plurality of PPUs 115 that is currently allocated that block (block 725). In one embodiment, the PPU 115 transmits a request to the PPU responsible for storing the DBAT entry in the DHT to obtain the IP address of the PPU 115 (or PPU ID) that is currently allocated the block.

The PPU 115 then notifies the PPU 115 that is currently allocated the block containing the IP address to be de-allocated that that IP address is to be de-allocated (block 730). The PPU 115 that receives the notification can then update its locally cached version of the DAAT 170 corresponding to that block to indicate that the IP address is now available. As a result of the exemplary IP address de-allocation process described above, the DAAT has been updated to indicate that the IP address to be de-allocated is now available. Also, the PPU 115 currently allocated the block containing the IP address to be de-allocated has been notified that the IP address to be de-allocated is to be de-allocated.

Figure 8:
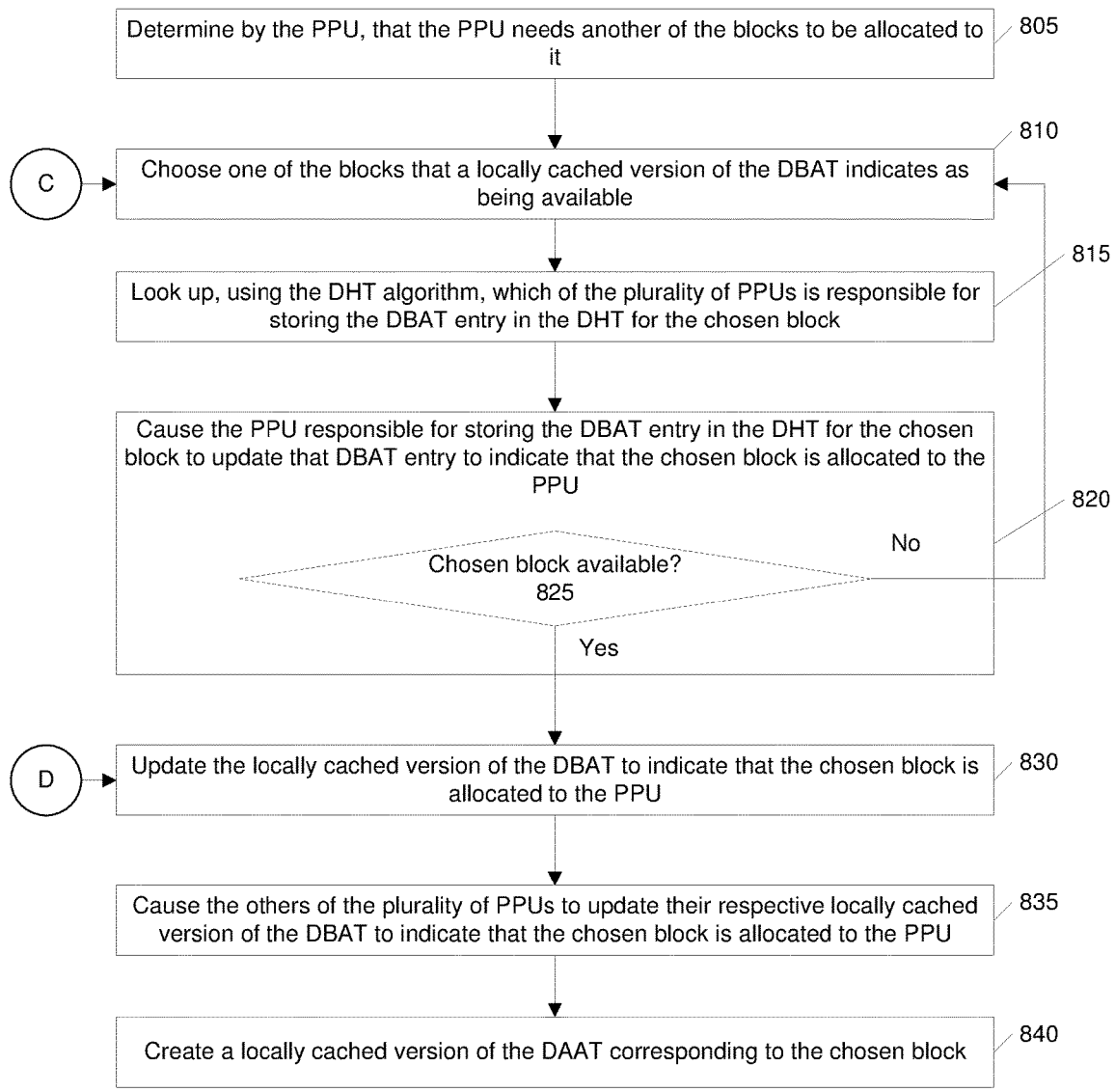
FIG. 8 is a flow diagram of one embodiment of a process for allocating a block to a PPU, from the perspective of a PPU allocating the block.

FIG. 8 is a flow diagram of one embodiment of a process for allocating a block to a PPU, from the perspective of a PPU allocating the block.

In one embodiment, the process is initiated when the PPU 115 determines that it needs another of the blocks to be allocated to it (block 805). In one embodiment, the PPU 115 can determine that it needs another block allocated to it if there are no IP addresses left available in the blocks currently allocated to the PPU 115. In another embodiment, the PPU 115 can determine the need for another block if the number of IP addresses available in the blocks currently allocated to the PPU 115 falls below a minimum threshold.

The PPU 115 chooses one of the blocks that a locally cached version of the DBAT 165 indicates as being available (block 810). In one embodiment, the PPU 115 accesses the locally cached version of the DBAT 165 to find and choose a block that is indicated as being available. The locally cached version of the DBAT 165 can be implemented in different ways by different embodiments, and its implementation may affect how it is accessed (e.g., linearly scanned/inspected, random inspection of entries, associative data structure lookup, parallel lookup via hardware, etc.). In one embodiment, the PPU 115 can jump over a random number of the first available blocks it finds to decrease the chance of picking the exact same block as other PPUs 115. In one embodiment, as part of block 810, the block ID of the block from which the IP address is used in block 815. In an implementation that does not use a locally cached DBAT 165, the PPU 115 can linearly search for a free block by repeatedly querying the DHT until an available block is found. In another embodiment, the PPU 115 can randomly choose a block and query the DHT to check if that block is available (and repeat until an available block is found).

The PPU 115 uses the DHT algorithm to look up which of the plurality of PPUs 115 is responsible for storing the DBAT entry in the DHT for the chosen block (block 815). In one embodiment, the PPU 115 looks up which of the plurality of PPUs 115 is responsible for storing the DBAT entry in the DHT for the chosen block by first generating the key. For example, for the key used in the previously described embodiment illustrated in FIG. 3, the PPU 115 uses the prefix (e.g., "BAT" which is known as it is a constant) and the block ID (which is known because it was selected in block 810) to generate the key. Second, the PPU 115 calculates a hash value of the key of that DBAT entry and the PPU 115 that has an ID that is closest to the hash value of the key is responsible for storing that DBAT entry, as described with reference to FIG. 1. The PPU responsible for storing the DBAT entry in the DHT could be a remote PPU or the PPU itself.

The PPU 115 then causes the PPU responsible for storing the DBAT entry in the DHT for the chosen block to update that DBAT entry to indicate that the chosen block is allocated to the PPU 115 (block 820). The locally cached version of the DBAT 165 only indicates which blocks are likely to be available. If the locally cached version of the DBAT 165 used to choose the block is out of sync (lacks coherency) with the actual DBAT (stored in the DHT), then it is possible that the chosen block is not available (i.e., is currently allocated to a different one of the PPUs 115 than the requesting one of the PPUs). As such, in some embodiments, the PPU 115 performs a check to determine whether the chosen block is indeed available (decision block 825). If the chosen block is not available, then the process returns to block 810, where the PPU 115 chooses a different block that its locally cached version of the DBAT 165 indicates as being available. If, the chosen block is indeed available, then the PPU 115 can proceed without choosing a different block. An embodiment of a process for causing a PPU responsible for storing a DBAT entry in the DHT for a chosen block to update that DBAT entry is described herein below in additional detail with reference to FIG. 9A.

Figure 9A:
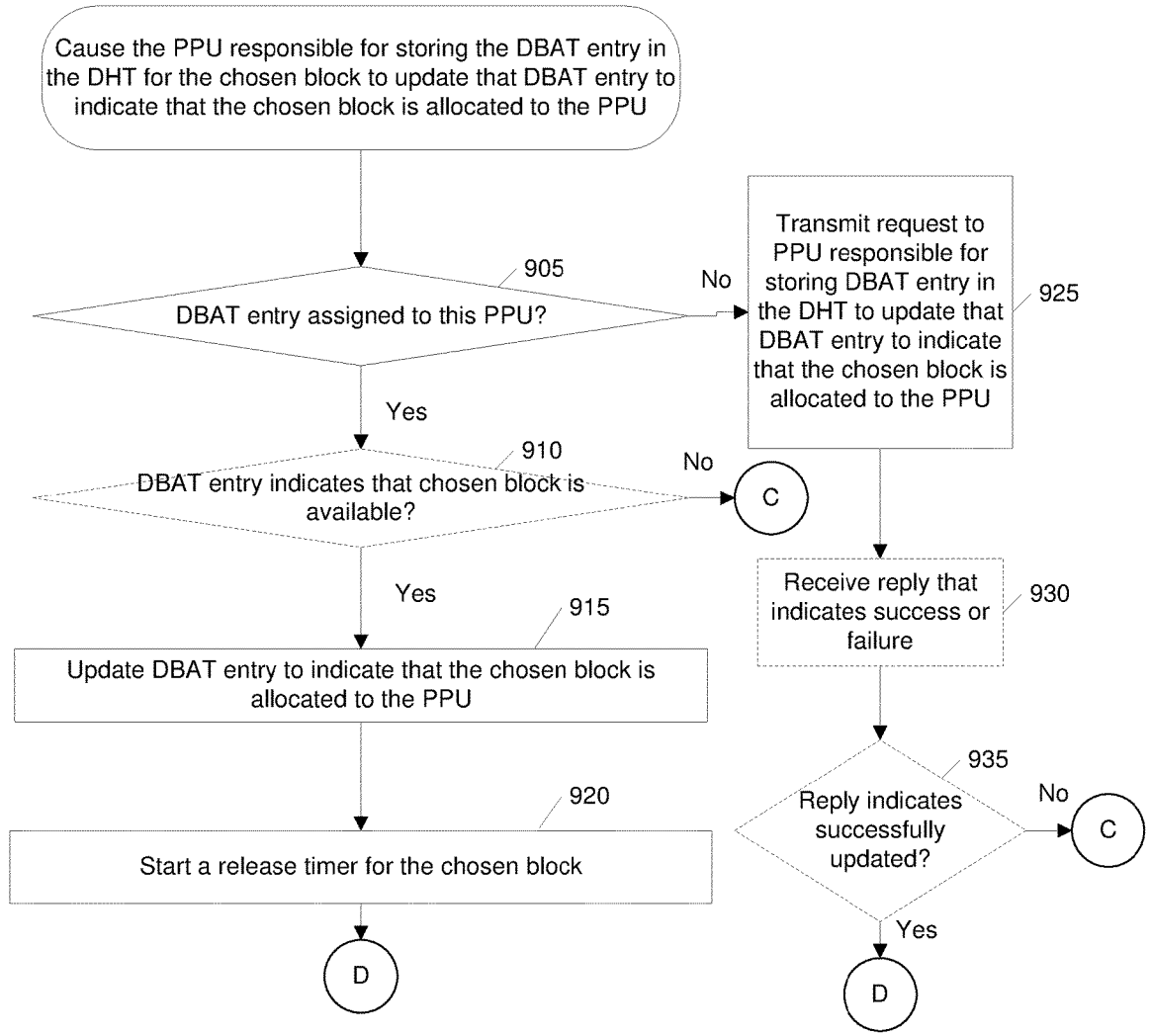
FIG. 9A is a flow diagram of one embodiment of a process for causing a PPU responsible for storing a DBAT entry in the DHT for a chosen block to update that DBAT entry.

FIG. 9A is a flow diagram of one embodiment of a process for causing a PPU responsible for storing a DBAT entry in the DHT for a chosen block to update that DBAT entry. It is to be noted that the PPU responsible for storing the DBAT entry for a chosen block could be a remote PPU or even the PPU itself. Thus, the PPU 115 checks whether the DBAT entry for the chosen block is assigned to itself (decision block 905). If so, the PPU 115 can directly check that DBAT entry to determine whether the chosen block is available (decision block 910), without having to transmit a request to a remote PPU 115. If the chosen block is available, then the PPU 115 can update that DBAT entry to indicate that the chosen block is now allocated to the PPU 115 (block 915). The PPU 115 then starts a release timer for the chosen block (block 920) and the process proceeds to block 830 to resume the block allocation process. The release timer for a block sets a length of time after which the block is automatically de-allocated. The operation of the release timer will be discussed in more detail herein below with relation to an embodiment of a block de-allocation process shown in FIG. 10. On the other hand, if the DBAT entry indicates that the chosen IP address is not available (i.e., is currently allocated to a different one of the PPUs 115 than the requesting one of the PPUs), then the process returns to block 810, where the PPU 115 chooses a different block that its locally cached version of the DAAT 170 indicates as being available.

Returning to decision block 905, if the DBAT entry for the chosen block is not assigned to this PPU 115 (i.e., assigned to a remote PPU), then the PPU 115 transmits a request to the PPU responsible for storing the DBAT entry in the DHT to update that DBAT entry to indicate that the chosen block is allocated to the PPU 115 (block 925). In one embodiment, the PPU 115 receives a reply that indicates whether the update was successful or not (block 930). The PPU checks whether the reply indicates that the DBAT entry was successfully updated (decision block 935). If the reply indicates that the update was not successful (block 935), then the process returns to block 810, where the PPU 115 chooses a different block that its locally cached version of the DAAT 170 indicates as being available. If the reply indicates that the update was successful (block 935), then the process proceeds to block 830 to resume the block allocation process.

Returning to FIG. 8, the PPU 115 also updates the locally cached version of the DBAT to indicate that the chosen block is allocated to the PPU 115 (block 830). In one embodiment, the PPU 115 also causes the others of the plurality of PPUs 115 to update their respective locally cached version of the DBAT 165 to indicate that the chosen block is allocated to the PPU 115 (block 835). In one embodiment, the PPU 115 causes other PPUs 115 to update their respective locally cached version of the DBAT 165 using an epidemic protocol or a gossip protocol (see Demers, et al., *Epidemic Algorithms for Replicated Database Maintenance*, In Proceedings of the 6$^{th}$ Annual ACM Symposium on Principles of Distributed Computing). If the epidemic protocol or gossip protocol fails to update a PPU's locally cached version of the DBAT 165, that PPU's cache could become out of sync (lose coherency) with the actual DBAT (stored in the DHT), and thus require the check described with reference to block 825 (and 910) in which the PPU 115 checks a DBAT entry for a block to see if that block is available just before allocating that block.

The PPU 115 can then create a locally cached version of the DAAT 170 corresponding to the chosen block (block 840). As previously described, the locally cached version of the DAAT 170 allows the PPU 115 to quickly scan for available IP addresses in the block without having to perform lookups in the DHT. If a PPU 115 that previously owned a block ungracefully crashes without releasing the block, there could still be IP addresses in the block that are still in use (i.e., allocated to a UE)—this is one way in which the locally cached version of the DAAT 170 could become out of sync (lose coherency) with the actual DAAT (stored in the DHT), and thus require the check described with reference to block 525 (and 610) in which the PPU 115 checks a DAAT entry for an IP address in the block to see if that IP address is available just before allocating that IP address. In another embodiment, when the PPU 115 first allocates a block to itself, the PPU 115 checks whether each IP address in that block is available by querying a DAAT entry for each of the IP addresses in that block, and then updates its locally cached version of the DAAT 170 based on results of the query to indicate which IP addresses in that block are available (this makes the locally cached version coherent with the actual DAAT (stored in the DHT), in which case, blocks 525 and 610 need not be performed).

As a result of the block allocation process described above, both the DBAT and the locally cached version of the DBAT 165 have been updated to indicate that the chosen block is allocated to the PPU 115. The PPU 115 can now allocate IP addresses from the chosen block (now allocated to the PPU 115), for example, by using an embodiment of the IP address allocation process described herein above with reference to FIG. 5.

Figure 9B:
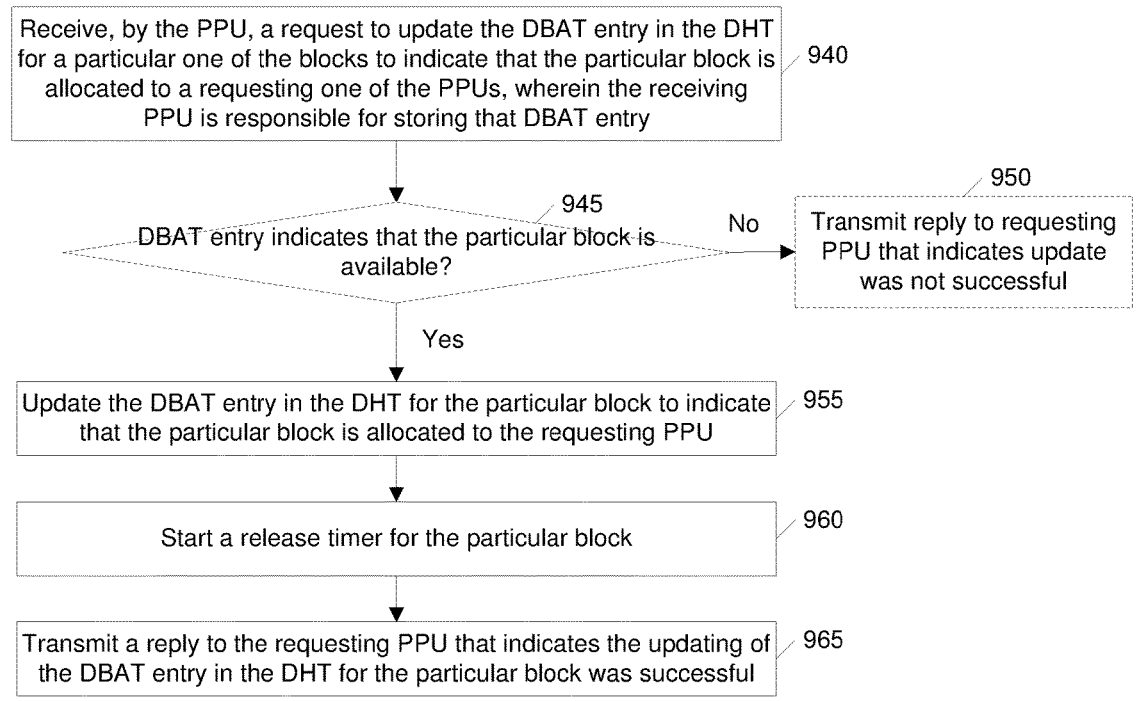
FIG. 9B is a flow diagram of one embodiment of a process for allocating a block to a PPU, from the perspective of a PPU that is responsible for storing a DBAT entry in the DHT for the block being allocated.

FIG. 9B is a flow diagram of one embodiment of a process for allocating a block to a PPU, from the perspective of a PPU that is responsible for storing a DBAT entry in the DHT for the block being allocated.

In one embodiment, the process is initiated when the PPU 115 receives, a request to update the DBAT entry in the DHT for a particular one of the blocks to indicate that the particular block is allocated to a requesting one of the PPUs 115, wherein the receiving PPU 115 is responsible for storing that DBAT entry (block 940). The PPU 115 checks whether the DBAT entry for the particular block is available (decision block 945). If the particular block is not available (i.e., is currently allocated to a different one of the PPUs 115 than the requesting one of the PPUs), then the PPU 115 transmits a reply to the requesting PPU 115 that indicates the update was not successful (block 950). If the particular block is available, then the PPU 115 updates the DBAT entry in the DHT for the particular block to indicate that the particular block is allocated to the requesting PPU 115 (block 955). The PPU 115 starts a release timer for the particular block (block 960) and transmits a reply to the requesting PPU 115 that indicates the updating of the DBAT entry in the DHT for the particular block was successful (block 965). The release timer sets a length of time after which the block is automatically de-allocated. Thus, in one embodiment, if the requesting PPU 115 wishes to keep the block allocated to itself, it needs to regularly send keep-alive messages to the PPU responsible for storing the DBAT entry for that block to reset the release timer. In another embodiment, a PPU 115 can keep a block allocated to itself by periodically re-allocating the block to itself.

Figure 10:
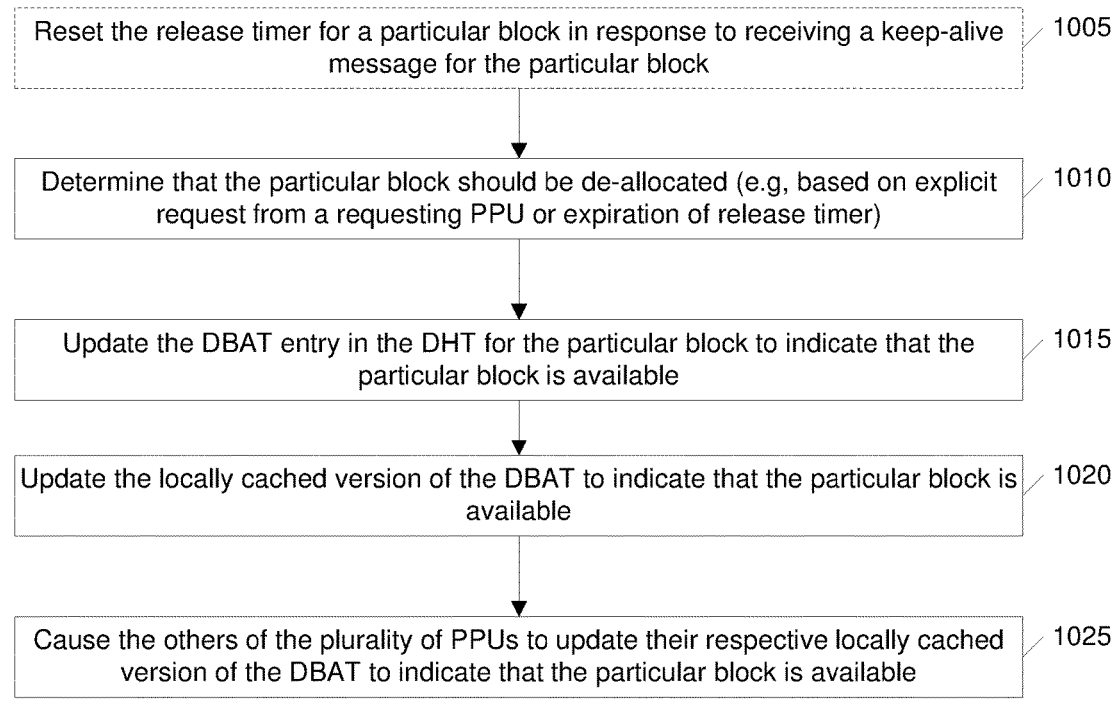
FIG. 10 is a flow diagram of one embodiment of a process for de-allocating a block, from the perspective of a PPU that is responsible for storing a DBAT entry in the DHT for the block being de-allocated.

FIG. 10 is a flow diagram of one embodiment of a process for de-allocating a block, from the perspective of a PPU that is responsible for storing a DBAT entry in the DHT for the block being de-allocated.

In one embodiment, the PPU responsible for storing the DBAT entry for a block resets the release timer in response to receiving a keep-alive message (or re-allocation request) for the block (block 1005). If a PPU 115 that has been allocated a block fails to re-allocate that block before the expiration of the release timer, it is assumed that the PPU 115 has crashed and that block is de-allocated. Thus, the release timer mechanism allows a PPU 115 to unplug from the EPC network 100 without having to gracefully release allocated blocks.

The PPU 115 determines that a particular block should be de-allocated (block 1010). In one embodiment, this determination is made based on an explicit request from a PPU 115 or based on expiration of a release timer. The PPU 115 then updates the DBAT entry in the DHT for the particular block to indicate that the particular block is available (block 1015). In one embodiment, the PPU 115 also updates its locally cached version of the DBAT 165 to indicate that the particular block is now available (block 1020). In one embodiment, the PPU 115 causes others of the plurality of PPUs 115 to update their respective locally cached version of the DBAT 165 to indicate that the chosen block is available (block 1025). In one embodiment, the PPU 115 causes other PPUs 115 to update their respective locally cached version of the DBAT 165 using an epidemic protocol or a gossip protocol as described above.

Figure 11A:
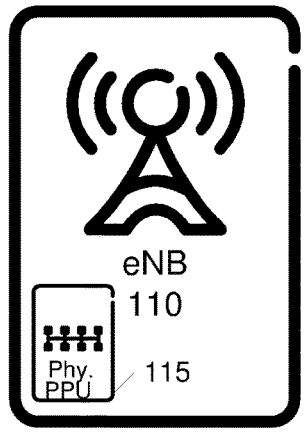
FIGS. 11A-D illustrate various implementation options for PPUs.
Figure 11B:
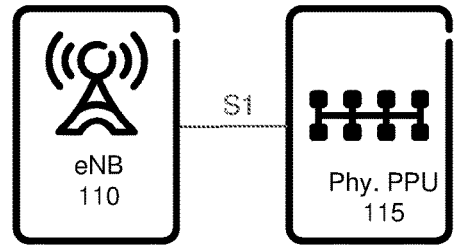
Figure 11C:
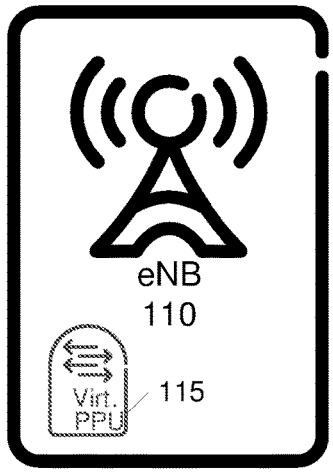
Figure 11D:
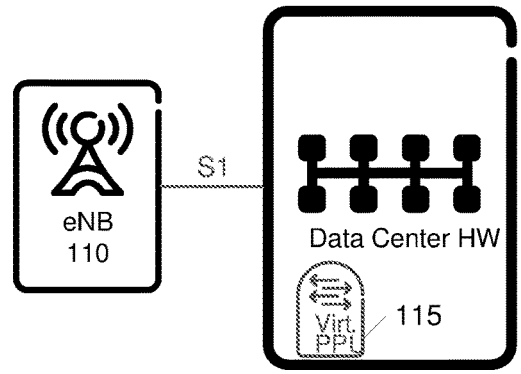

FIGS. 11A-D illustrate various implementation options for PPUs. In FIG. 11A, a physical PPU 115 is implemented in an eNB 110, for example as a processing blade. The eNB 110 and the physical PPU 115 are connected via an internal S1 interface. In FIG. 11B, a physical PPU 115 is implemented as a stand-alone device/box that is connected to an eNB 110 via an external S1 interface. In FIG. 11C, a virtual PPU 115 is implemented as a virtual machine running on a hypervisor (or as a software container), which is running on a processor and memory within an eNB 110. The eNB 110 and the virtual PPU 115 are connected via an internal S1 interface. In FIG. 11D, a virtual PPU 115 is implemented on general data center hardware or in a cloud platform (i.e., the virtual PPU 115 is implemented on a virtual machine running on a hypervisor (or as a software container), which is running on a processor and memory) connected to the eNB 110 via an external S1 interface.

An electronic device stores and transmits (internally and/or with other electronic devices over a network) code (which is composed of software instructions and which is sometimes referred to as computer program code or a computer program) and/or data using machine-readable medium (also called computer-readable medium), such as machine-readable storage medium (e.g., magnetic disks, optical disks, read only memory (ROM), flash memory devices, phase change memory) and machine-readable transmission medium (also called a carrier) (e.g., electrical, optical, radio, acoustical or other form of propagated signals—such as carrier waves, infrared signals). Thus, an electronic device (e.g., a computer) typically includes hardware and software, such as a set of one or more processors coupled to one or more machine-readable storage medium to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Figure 12:
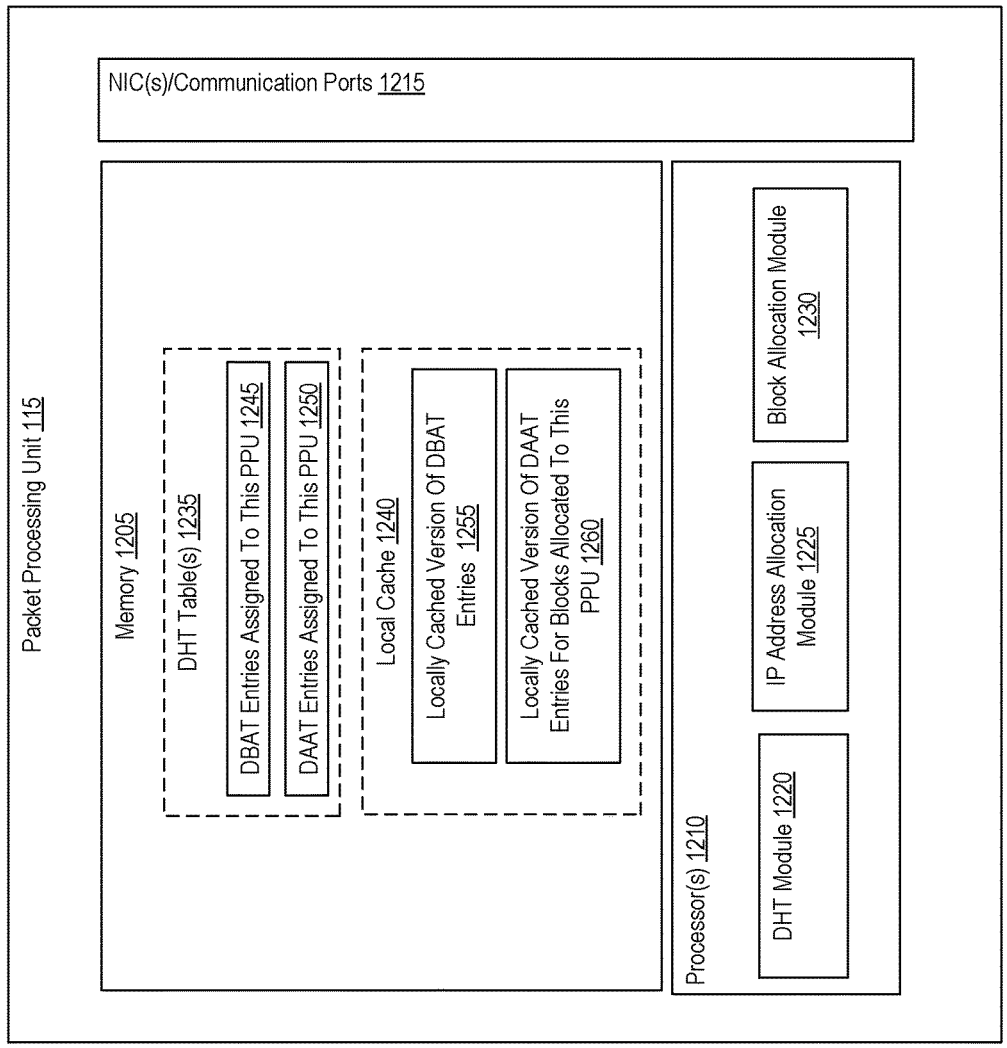
FIG. 12 is a diagram of one embodiment of a physical PPU that can implement IP address allocation and de-allocation processes to participate in a distributed IP address allocation and de-allocation mechanism.

FIG. 12 is a diagram of one embodiment of a PPU or network device that can implement IP address allocation/de-allocation and block allocation/de-allocation processes.

The physical (i.e., hardware) PPU 115 is a network device that can perform some or all of the operations and methods described above for one or more of the embodiments. The physical PPU 115 can include one or more network interface controllers (NICs; also known as network interface cards) 1215, processor(s) ("processor circuitry") 1210, memory 1205, a DHT module 1220, an IP address allocation module 1225, and a block allocation module 1230.

The processor(s) 1210 may include one or more data processing circuits, such as a general purpose and/or special purpose processor (e.g., microprocessor and/or digital signal processor). The processor(s) is configured to execute the DHT Module 1220, the IP address allocation module 1225, and the block allocation module 1230, to perform some or all of the operations and methods described above for one or more of the embodiments, such as the embodiments of FIGS. 5-10. The DHT module 1220, when executed by the processor 1210 may create a DHT table 1235 in the memory to store DBAT entries assigned to the PPU 1245 and DAAT entries assigned to the PPU 1250. The IP address allocation module 1225 and block allocation module 1230, when executed by the processor 1210, may create a local cache 1240 in the memory 1205 to store a locally cached version of DBAT entries 1255 and a locally cached version of DAAT entries for blocks allocated to the PPU 1260. Although the various modules of FIG. 12 are shown to be included as part of the processor 1210, one having ordinary skill in the art will appreciate that the various modules may be stored separately from the processor, for example, in a non-transitory computer readable storage medium. The processor can execute the various modules stored in the non-transitory computer readable medium, to perform some or all of the operations and methods described above. Accordingly, the processor can be configured by execution of various modules to carry out some or all of the functionality disclosed herein.

Figure 13:
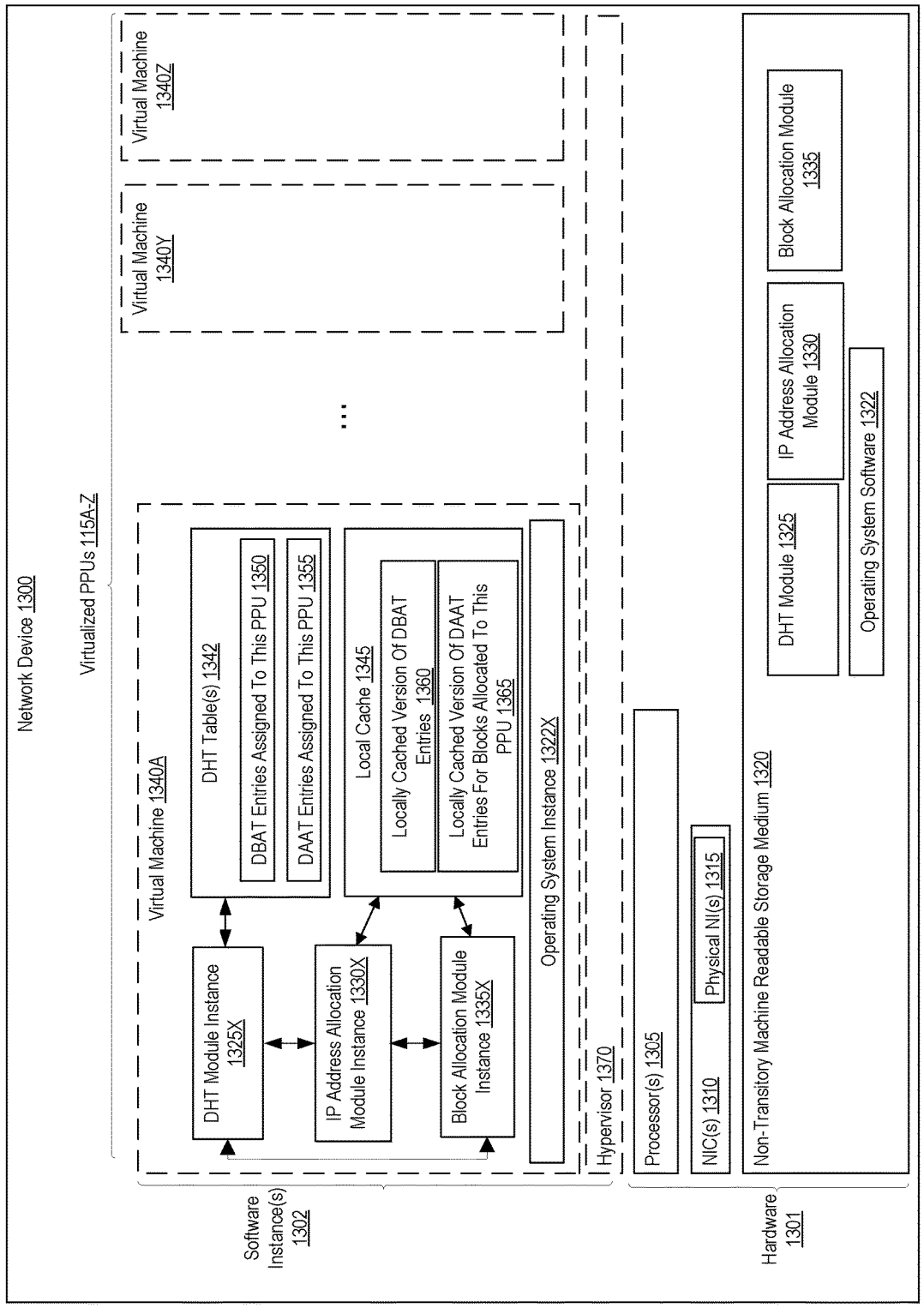
FIG. 13 is a diagram of one embodiment of a network device that can implement one or more virtual PPUs that can implement IP address allocation and de-allocation processes to participate in a distributed IP address allocation and de-allocation mechanism.

FIG. 13 is a diagram of one embodiment of a network device that can implement one or more virtual PPUs that can implement IP address allocation/de-allocation and block allocation/de-allocation processes.

The network device 1300 includes hardware 1301 comprising a set of one or more processor(s) 1305 (which are often commercial off-the-shelf COTS processors) and NIC(s) 1310 (which include physical NIs 1315), as well as non-transitory machine readable storage medium 1320 having stored therein a DHT module 1325, an IP address allocation module 1330, a block allocation module 1335, and operating system (OS) software 1322. A physical NI 1315 is hardware in a network device 1300 through which a network connection (e.g., wirelessly through a wireless network interface controller (WNIC) or through plugging in a cable to a physical port connected to a NIC 1310) is made. During operation, the processor(s) 1305 may execute software to instantiate a hypervisor 1370 (sometimes referred to as a virtual machine monitor (VMM)) and one or more virtual machines 1340A-Z that are run by the hypervisor 1370, which are collectively referred to as software instance(s) 1302. A virtual machine 1340 is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 1340A-Z, and that part of the hardware 1301 that executes that virtual machine (be it hardware dedicated to that virtual machine and/or time slices of hardware temporally shared by that virtual machine with others of the virtual machine(s)), may form a separate virtual PPU.

Each such virtual PPU can include a DHT module instance 1325X, an IP address allocation module instance 1330X, and a block allocation module instance 1335X. The DHT module instance 1325X, when executed, may create a DHT table 1342 in the memory of the virtual machine 1340A to store DBAT entries assigned to the virtual PPU 1350 and DAAT entries assigned to the virtual PPU 1355. The IP address allocation module instance 1330X and block allocation module instance 1335X, when executed, may create a local cache 1345 in the memory of the virtual machine 1340A to store a locally cached version of DBAT entries 1360 and a locally cached version of DAAT entries for blocks allocated to the virtual PPU 1365.

A virtual PPU performs similar functionality to the PPU 115 illustrated in FIG. 12. For instance, the hypervisor 1370 may present a virtual operating platform that appears like networking hardware to virtual machine 1340, and the virtual machine 1340 may be used to implement functionality of the DHT module 1325, IP address allocation module 1330, and block allocation module 1335 (this virtualization of the hardware is sometimes referred to as network function virtualization (NFV)). Thus, NFV may be used to consolidate many network equipment types onto industry standard high volume server hardware, physical switches, and physical storage, which could be located in Data centers, network devices, and customer premise equipment (CPE). While one embodiment implements virtualization with the hypervisor 1370 and virtual machines 1340A-Z, alternative embodiments may use other techniques (e.g., using operating system level virtualization where, instead of a hypervisor and virtual machines, the kernel of the operating system allows for multiple user space instances (often called software containers, virtualization engines, virtual private servers, or jails) that may execute a virtualized PPU.

An advantage provided by the processes described herein above is that it allows PPUs of the distributed S/PGW to be able to independently allocate IP addresses from a shared pool of IP addresses without relying on a single IP address allocation server or cluster of servers. PPUs that join to participate as a node in the DHT can allocate IP addresses independently of other PPUs. Moreover, if a PPU fails, or otherwise becomes unavailable, another PPU can automatically take over the failed PPU's responsibilities (i.e., maintenance of DBAT entries and DAAT entries in the DHT). This self-healing and self-configurable aspect allows PPUs to join and leave a distributed S/PGW in a plug-and-play fashion.

Thus, a method, system, and apparatus to support a distributed IP allocation mechanism in a communications network having a distributed S/PGW architecture has been described. While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting. Many variations and modifications can be made to the embodiments without substantially departing from the principles of the present invention. All such variations and modifications are intended to be included herein within the scope of the present invention.

The invention claimed is:

1. A non-transitory computer readable medium having stored therein instructions to be executed by a packet processing unit (PPU) in a communications network to allow a plurality of PPUs in the communications network to independently allocate IP addresses from a shared pool of IP addresses, the instructions when executed by the PPU cause the PPU to perform a set of operations comprising:

receiving, by the PPU, a request to allocate an IP address to a user entity (UE), wherein the plurality of PPUs in the communications network collectively maintain a distributed hash table (DHT), the DHT stores a distributed block allocation table (DBAT) and a plurality of distributed address allocation tables (DAATs), wherein the DBAT includes an entry for each of a plurality of blocks of IP addresses to indicate which of the plurality of blocks of IP addresses are allocated to which of the plurality of PPUs, and wherein each of the plurality of DAATs corresponds to one of the blocks identified in the DBAT and includes an entry for each of the IP addresses in that one block to indicate which of the IP addresses in that one block are allocated to which UEs;

choosing, from a first block of IP addresses currently allocated to the PPU, one of the IP addresses in the first block that a locally cached version of the DAAT corresponding to the first block indicates as being available;

looking up, using a DHT algorithm, which of the plurality of PPUs is responsible for storing the DAAT entry in the DHT for the chosen IP address;

causing the PPU responsible for storing the DAAT entry in the DHT for the chosen IP address to update that DAAT entry to indicate that the chosen IP address is allocated to the UE;

updating the locally cached version of the DAAT corresponding to the first block to indicate that the chosen IP address is allocated to the UE;

allocating the chosen IP address to the UE;

determining, by the PPU, that the PPU needs another of the blocks of IP addresses to be allocated to it;

choosing one of the blocks of IP addresses that a locally cached version of the DBAT indicates as being available;

looking up, using the DHT algorithm, which of the plurality of PPUs is responsible for storing the DBAT entry in the DHT for the chosen block;

causing the PPU responsible for storing the DBAT entry in the DHT for the chosen block to update that DBAT entry to indicate that the chosen block is allocated to the PPU;

updating the locally cached version of the DBAT to indicate that the chosen block is allocated to the PPU;

causing the others of the plurality of the PPUs to update their respective locally cached version of the DBAT to indicate that the chosen block is allocated to the PPU; and creating a locally cached version of the DAAT corresponding to the chosen block.

2. The non-transitory computer readable medium of claim 1, wherein the causing the PPU responsible for storing the DAAT entry in the DHT for the chosen IP address to update that DAAT entry comprises:

transmitting a request, to the PPU responsible for storing the DAAT entry in the DHT for the chosen IP address, to update that DAAT entry to indicate that the chosen IP address is allocated to the UE; and receiving a reply, from the PPU responsible for storing the DAAT entry in the DHT for the chosen IP address, that indicates whether the update of that DAAT entry was successful.

3. The non-transitory computer readable medium of claim 1, wherein the instructions when executed by the PPU cause the PPU to perform a further set of operations comprising:

receiving a request to de-allocate a first IP address that is currently allocated to a first UE being served by the PPU, wherein the first IP address is included in a second block of IP addresses;

looking up, using the DHT algorithm, which of the plurality of PPUs is responsible for storing the DAAT entry in the DHT for the first IP address;

causing the PPU responsible for storing the DAAT entry in the DHT for the first IP address to update that DAAT entry to indicate that the first IP address is available;

looking up, using the DHT algorithm, which of the plurality of PPUs is responsible for storing a DBAT entry in the DHT for the second block of IP addresses;

accessing, from the PPU responsible for storing the DBAT entry in the DHT for the second block of IP addresses, the one of the plurality of PPUs that is currently allocated that block; and notifying the PPU that is currently allocated the second block that the first IP address is to be de-allocated.

4. The non-transitory computer readable medium of claim 1, wherein the causing the PPU responsible for storing the DBAT entry in the DHT for the chosen block to update that DBAT entry comprises:

transmitting a request, to the PPU responsible for storing the DBAT entry in the DHT for the chosen block, to update that DBAT entry to indicate that the chosen block is allocated to the PPU; and receiving a reply, from the PPU responsible for storing the DBAT entry in the DHT for the chosen block, that indicates whether the update of that DBAT entry was successful.

5. The non-transitory computer readable medium of claim 1, wherein the instructions when executed by the PPU cause the PPU to perform a further set of operations comprising:

determining, for each of the IP addresses in the chosen block, whether that IP address is available based on queries to those of the DAAT entries in the DHT for the IP addresses in the chosen block; and updating the locally cached version of the DAAT corresponding to the chosen block based on results of the queries to indicate which of the IP addresses in the chosen block are available.

6. The non-transitory computer readable medium of claim 1, wherein the causing the others of the plurality of PPUs to update their respective locally cached version of the DBAT is performed using an epidemic protocol or a gossip protocol.

7. The non-transitory computer readable medium of claim 1, wherein the locally cached version of the DBAT is stored as a bit vector where one or more indices of the bit vector corresponds to block indices and a bit value indicates whether the block is available or not.

8. The non-transitory computer readable medium of claim 1, wherein the instructions when executed by the PPU cause the PPU to perform a further set of operations comprising:

receiving, by the PPU, a request to update the DBAT entry in the DHT for a particular one of the blocks to indicate that the particular block is allocated to a requesting one of the PPUs, wherein the receiving PPU is responsible for storing that DBAT entry;

updating the DBAT entry in the DHT for the particular block to indicate that the particular block is allocated to the requesting PPU;

starting a release timer for the particular block; and transmitting a reply to the requesting PPU that indicates the updating of the DBAT entry in the DHT for the particular block was successful.

9. The non-transitory computer readable medium of claim 8, wherein the instructions when executed by the PPU cause the PPU to perform a further set of operations comprising:

resetting the release timer for the particular block in response to receiving a keep-alive message for the particular block.

10. The non-transitory computer readable medium of claim 8, wherein the instructions when executed by the PPU cause the PPU to perform a further set of operations comprising:

updating the DBAT entry in the DHT for the particular block to indicate that the particular block is available when the release timer expires;

updating the locally cached version of the DBAT to indicate that the particular block is available; and causing the others of the plurality of PPUs to update their respective locally cached version of the DBAT to indicate that the particular block is available.

11. The non-transitory computer readable medium of claim 8, wherein the instructions when executed by the PPU cause the PPU to perform a further set of operations comprising:

updating the DBAT entry in the DHT for the particular block to indicate that the particular block is available in response to receiving a request from the requesting PPU to de-allocate the particular block.

12. The non-transitory computer readable medium of claim 1, wherein the DHT stores different ones of the entries at different ones of the PPUs maintaining the DHT based on proximity of a hash value of a key for the different ones of the entries to an identifier for the different ones of the PPUs according to a distance metric.

13. The non-transitory computer readable medium of claim 1, wherein the DHT is implemented using any one of a Chord DHT algorithm, a Pastry DHT algorithm, and a Kademlia DHT algorithm.

14. The non-transitory computer readable medium of claim 1, wherein one or more of the entries of the DBAT is a key-value pair where the key is a string that is generated based on a block identifier of one of the plurality of blocks and where the value is a string that is generated based on an IP address of one of the plurality of PPUs.

15. The non-transitory computer readable medium of claim 1, wherein one or more of the entries of the DAATs is a key-value pair where the key is a string that is generated based on a block identifier of one of the plurality of blocks and one of the IP addresses in that block, and where the value is a string that is generated based on a UE identifier.

16. A method performed by a Packet Processing Unit (PPU) in a communications network to allow a plurality of PPUs in the communications network to independently allocate IP addresses from a shared pool of IP addresses, the method comprising:

receiving, by the PPU, a request to allocate an IP address to a user entity (UE), wherein the plurality of PPUs in the communications network collectively maintain a distributed hash table (DHT), the DHT stores a distributed block allocation table (DBAT) and a plurality of distributed address allocation tables (DAATs), wherein the DBAT includes an entry for each of a plurality of blocks of IP addresses to indicate which of the plurality of blocks are allocated to which of the plurality of PPUs, and wherein each of the plurality of DAATs corresponds to one of the blocks in the DBAT and includes an entry for each of the IP addresses in that block to indicate which of the IP addresses in that block are allocated to which UEs;

choosing, from the plurality of blocks of IP addresses currently allocated to the PPU, one of the IP addresses in the block that a locally cached version of the DAAT corresponding to the block indicates as being available;
looking up, using a DHT algorithm, which of the plurality of PPUs is responsible for storing the DAAT entry in the DHT for the chosen IP address;
causing the PPU responsible for storing the DAAT entry in the DHT for the chosen IP address to update that DAAT entry to indicate that the chosen IP address is allocated to the UE;
updating the locally cached version of the DAAT corresponding to the block to indicate that the chosen IP address is allocated to the UE;
allocating the chosen IP address to the UE; and
determining, by the PPU, that that PPU needs another of the blocks to be allocated to it; choosing one of the blocks that a locally cached version of the DBAT (420) indicates as being available;
looking up, using the DHT algorithm, which of the plurality of PPUs is responsible for storing the DBAT entry in the DHT for the chosen block;
causing the PPU responsible for storing the DBAT entry in the DHT for the chosen block to update that DBAT entry to indicate that the chosen block is allocated to the PPU;
updating the locally cached version of the DBAT to indicate that the chosen block is allocated to the PPU;
causing the others of the plurality of PPUs to update their respective locally cached version of the DBAT to indicate that the chosen block is allocated to the PPU; and
creating a locally cached version of the DAAT corresponding to the chosen block.

17. A network device to function as a Packet Processing Unit (PPU) in a communications network to allow a plurality of PPUs in the communications network to independently allocate IP addresses from a shared pool of IP addresses, the network device comprising:
a set of one or more processors; and
a memory containing instructions, which when executed by the set of one or more processors, cause the network device to:
receive a request to allocate an IP address to a user entity (UE), wherein the plurality of PPUs in the communications network are to collectively maintain a distributed hash table (DHT), the DHT stores a distributed block allocation table (DBAT) and a plurality of distributed address allocation tables (DAATs), wherein the DBAT includes an entry for each of a plurality of blocks of IP addresses to indicate which of the plurality of blocks are allocated to which of the plurality of PPUs, and wherein each of the plurality of DAATs corresponds to one of the blocks in the DBAT and includes an entry for each of the IP addresses in that block to indicate which of the IP addresses in that block are allocated to which UEs,
choose, from a first block of IP addresses currently allocated to the PPU, one of the IP addresses in the first block that a locally cached version of the DAAT corresponding to the first block indicates as being available,
look up, using a DHT algorithm, which of the plurality of PPUs is responsible for storing the DAAT entry in the DHT for the chosen IP address,
cause the PPU responsible for storing the DAAT entry in the DHT for the chosen IP address to update that DAAT entry to indicate that the chosen IP address is allocated to the UE,
update the locally cached version of the DAAT corresponding to the block to indicate that the chosen IP address is allocated to the UE,
allocate the chosen IP address to the UE; and
wherein the memory contains further instructions, which when executed by the set of one or more processors, cause the network device to:
determine, that the PPU needs another of the blocks to be allocated to it,
choose one of the blocks that a locally cached version of the DBAT indicates as being available,
look up, using the DHT algorithm, which of the plurality of PPUs is responsible for storing the DBAT entry in the DHT for the chosen block,
cause the PPU responsible for storing the DBAT entry in the DHT for the chosen block to update that DBAT entry to indicate that the chosen block is allocated to the PPU,
update the locally cached version of the DBAT to indicate that the chosen block is allocated to the PPU,
cause the others of the plurality of PPUs to update their respective locally cached version of the DBAT to indicate that the chosen block is allocated to the PPU, and
create a locally cached version of the DAAT corresponding to the chosen block.

* * * * *